United States Patent
Pettersson et al.

(10) Patent No.: US 12,294,741 B2
(45) Date of Patent: May 6, 2025

(54) DECODING BASED ON BI-DIRECTIONAL PICTURE CONDITION

(71) Applicant: Telefonaktiebolaget LM Ericsson (publ), Stockholm (SE)

(72) Inventors: Martin Pettersson, Vallentuna (SE); Ruoyang Yu, Täby (SE); Rickard Sjöberg, Stockholm (SE); Mitra Damghanian, Upplands-Bro (SE); Zhi Zhang, Solna (SE); Jack Enhorn, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 187 days.

(21) Appl. No.: 17/907,704

(22) PCT Filed: Mar. 30, 2021

(86) PCT No.: PCT/SE2021/050286
§ 371 (c)(1),
(2) Date: Sep. 29, 2022

(87) PCT Pub. No.: WO2021/201759
PCT Pub. Date: Oct. 7, 2021

(65) Prior Publication Data
US 2023/0137221 A1 May 4, 2023

Related U.S. Application Data

(60) Provisional application No. 63/004,051, filed on Apr. 2, 2020.

(51) Int. Cl.
*H04N 19/70* (2014.01)
*H04N 19/159* (2014.01)
*H04N 19/169* (2014.01)

(52) U.S. Cl.
CPC ........... *H04N 19/70* (2014.11); *H04N 19/159* (2014.11); *H04N 19/188* (2014.11)

(58) Field of Classification Search
CPC .... H04N 19/70; H04N 19/159; H04N 19/188; H04N 19/597; H04N 19/50; H04N 19/174; H04N 19/577
See application file for complete search history.

(56) References Cited

U.S. PATENT DOCUMENTS

| 10,375,416 B1 | 8/2019 | Wenger et al. |
| 2005/0053292 A1 | 3/2005 | Mukerjee et al. |

(Continued)

FOREIGN PATENT DOCUMENTS

| CN | 105075267 A | 11/2015 |
| CN | 110062240 A | 7/2019 |

(Continued)

OTHER PUBLICATIONS

International Search Report and Written Opinion issued in International Application No. PCT/SE2021/050286 dated May 26, 2021 (17 pages).
M. Pettersson et al., "AHG9: On B-slice signaling in the PH and the derivation of slice_type", JVET of ITU-T SG 16 WP 3 and ISO/IEC JTC 1/SC 29/WG 11 18th Meeting (by teleconference), Apr. 15-24, 2020, No. JVET-R0250, 5 pages.

(Continued)

*Primary Examiner* — Richard T Torrente
(74) *Attorney, Agent, or Firm* — Rothwell, Figg, Ernst & Manbeck, P.C.

(57) ABSTRACT

A methods and apparatuses for encoding or decoding a segment in a coded picture. The decoding may include obtaining from a bitstream a value of a first codeword that indicates whether the coded picture may contain bi-directional inter coded segments or not. The decoding may include, based on the value of the first codeword, deriving one or more parameter values by either (a) decoding one or more parameters from the bitstream to obtain the one or more parameter values or (b) inferring the one or more (Continued)

parameter values. The decoding may include decoding the segment in the coded picture based on the one or more parameter values. The encoding may include encoding the first codeword to the bitstream and determining whether to encode one or more parameter values in the bitstream based on a determination of whether the coded picture will contain bi-directional inter coded segments or not.

16 Claims, 11 Drawing Sheets

(56) References Cited

U.S. PATENT DOCUMENTS

| | | | |
|---|---|---|---|
| 2013/0114742 A1 | 5/2013 | Hannuksela et al. | |
| 2013/0188733 A1 | 7/2013 | Van der Auwera et al. | |
| 2014/0198181 A1 | 7/2014 | Chen et al. | |
| 2015/0016502 A1 | 1/2015 | Rapaka et al. | |
| 2015/0304667 A1 | 10/2015 | Suehring et al. | |
| 2017/0034526 A1 | 2/2017 | Rapaka et al. | |
| 2017/0302951 A1 | 10/2017 | Joshi et al. | |
| 2020/0186830 A1 | 6/2020 | Seregin et al. | |
| 2022/0400256 A1* | 12/2022 | Deng | H04N 19/132 |
| 2023/0042746 A1* | 2/2023 | Deng | H04N 19/132 |

FOREIGN PATENT DOCUMENTS

| | | |
|---|---|---|
| WO | 2018/219925 A1 | 12/2018 |
| WO | 2020/042916 A1 | 3/2020 |
| WO | 2020/130910 A1 | 6/2020 |

OTHER PUBLICATIONS

R. Yu et al., "AHG9: Three restrictions when RPL is present in PH", JVET of ITU-T SG 16 WP 3 and ISO/IEC JTC 1/SC 29/WG 11 18th Meeting (by teleconference), Apr. 15-24, 2020, No. JVET-R0253, 3 pages.

Bross, Benjamin, et al., "Versatile Video Coding (Draft 8)", Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020, 510 pages.

Extended European Search Report issued in European Application No. 21781666.9 dated Jun. 19, 2023 (10 pages).

Bross, Benjamin et al., "Versatile Video Coding (Draft 8)", Joint Video Experts Team (JVET) of ITU-T SG 16 WP 3 and ISO/IEC JTC 1/SC 29/WG 11, No. JVET-Q2001-vC, 17th Meeting: Brussels, BE, Jan. 7-17, 2020, XP030285388, 509 pages.

Samuelsson, Jonatan et al., "AHG9: On Picture Header", Joint Video Experts Team (JVET) of ITU-T SG 16 WP 3 and ISO/IEC JTC 1/SC 29/WG 11, No. JVET-Q0259, 17th Meeting: Brussels, BE, Jan. 7-17, 2020, XP030222998, 10 pages.

* cited by examiner

DECODING BASED ON BI-DIRECTIONAL PICTURE CONDITION

CROSS REFERENCE TO RELATED APPLICATION

This application is a 35 U.S.C. § 371 National Phase Entry Application from PCT/SE2021/050286, filed Mar. 30, 2021, designating the United States, which claims priority to U.S. Provisional Patent Application No. 63/004,051, filed Apr. 2, 2020, the disclosures of which are incorporated herein by reference in their entirety.

TECHNICAL FIELD

This disclosure relates to encoding and decoding pictures (e.g., encoding/decoding a video sequence). Some aspects of this disclosure relate to indicating whether a coded picture may contain bi-directional inter coded segments or not.

BACKGROUND

HEVC and VVC

High Efficiency Video Coding (HEVC) is a block-based video codec standardized by International Telecommunication Union-Telecommunication (ITU-T) and Motion Picture Experts Group (MPEG) that utilizes both temporal and spatial prediction. Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized, and then entropy coded before being transmitted together with necessary prediction parameters (e.g., prediction mode and motion vectors), which are also entropy coded. The decoder performs entropy decoding, inverse quantization, and inverse transformation to obtain the residual and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). The current version of the VVC specification at the time of writing this text is JVET-Q2001-vE.

Components

A video sequence consists of a series of images where each image consists of one or more components. Each component can be described as a two-dimensional rectangular array of sample values. It is common that an image in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components.

Blocks and Units

A block is one two-dimensional array of samples. In video coding, each component is split into blocks, and the coded video bitstream consists of a series of coded blocks. It is common in video coding that the image is split into units that cover a specific area of the image. Each unit consists of all blocks from all components that make up that specific area, and each block belongs fully to one unit. The macroblock in H.264 and the Coding unit (CU) in HEVC and VVC are examples of units. In HEVC and VVC, the CUs may be split recursively to smaller CUs. The CU at the top level is referred to as the coding tree unit (CTU).

A block can alternatively be defined as a two-dimensional array to which a transform used in coding is applied. These blocks are known under the name "transform blocks". Alternatively, a block can be defined as a two-dimensional array to which a single prediction mode is applied. These blocks can be called "prediction blocks". In this application, the word block is not tied to one of these definitions, but that the descriptions herein can apply to either definition.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC and the current version of VVC begins with a header called the NAL unit header. The syntax for the NAL unit header for HEVC is shown in Table 1 and starts with a forbidden_zero_bit that shall always be equal to 0 to prevent start code emulations. Without the forbidden_zero_bit, some MPEG systems might confuse the HEVC video bitstream with other data. However, the 0 bit in the NAL unit header makes all possible HEVC bitstreams uniquely identifiable as HEVC bitstreams. The nal_unit_type, nuh_layer_id, and nuh_temporal_id_plus1 code words specify the NAL unit type of the NAL unit that identifies what type of data is carried in the NAL unit, the layer ID, and the temporal ID to which the NAL unit belongs, respectively. The NAL unit type indicates and specifies how the NAL unit should be parsed and decoded. The NAL unit header in the current version of VVC, shown in Table 2, is very similar to the one in HEVC, but uses 1 bit less for the nal_unit_type and instead reserves this bit for future use.

The rest of the bytes of the NAL unit is payload of the type indicated by the NAL unit type. A bitstream consists of a series of concatenated NAL units.

TABLE 1

HEVC NAL unit header syntax

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

TABLE 2

NAL unit header syntax of the current version of VVC

| | Descriptor |
|---|---|
| nal_unit_header( ) { | |
|   forbidden_zero_bit | f(1) |
|   nuh_reserved_zero_bit | u(1) |
|   nuh_layer_id | u(6) |
|   nal_unit_type | u(5) |

TABLE 2-continued

NAL unit header syntax of the current version of VVC

|  | Descriptor |
|---|---|
| nuh_temporal_id_plus1 | u(3) |
| } | |

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft are shown in Table 6.

The decoding order is the order in which NAL units shall be decoded, which is the same as the order of the NAL units within the bitstream. The decoding order may be different from the output order, which is the order in which decoded pictures are to be output, such as for display, by the decoder.

Temporal Layers

In HEVC and in the current version of VVC, all pictures are associated with a TemporalId value which specifies the temporal layer to which the picture belongs. TemporalId values are decoded from the nuh_temporal_id_plus1 syntax element in the NAL unit header. In HEVC, the encoder is required to set TemporalId values such that pictures belonging to a lower layer are perfectly decodable when higher temporal layers are discarded. Assume for instance that an encoder has output a bitstream using temporal layers 0, 1, and 2. The bitstream can be decoded without problems even if all layer 2 NAL units or all layer 1 and layer 2 NAL units are removed. The ability for pictures belonging to a lower layer to be decodable when higher temporal layers are discarded is ensured by restrictions in the HEVC/VVC specifications with which the encoder must comply. For instance, the HEVC/VVC specifications do not allow for a picture of a temporal layer to reference a picture of a higher temporal layer.

Picture Unit, Access Unit, and the Access Unit Delimiter

A picture unit (PU) in the current version of VVC is defined as a set of NAL units for which the VCL NAL units all belong to the same layer, that are associated with each other according to a specified classification rule, that are consecutive in decoding order, and that contain exactly one coded picture. In previous versions of VVC, the PU was called layer access unit. In HEVC, the PU is referred to as an access unit (AU).

In VVC, an access unit is a set of PUs that belong to different layers and contain coded pictures associated with the same time for output from the decoded picture buffer (DPB), i.e. having the same POC value.

An access unit, in the current version of VVC, may optionally start with an access unit delimiter (AUD) NAL unit which indicates the start of the access unit and the type of the slices allowed in the coded picture (i.e. I, I-P, or I-P-B). In HEVC, it is optional for an AU to start with an AUD. The syntax and semantics for the access unit delimiter NAL unit in the current version of the VVC draft is shown below.

TABLE 3

Access unit delimiter RBSP syntax in the current version of the VVC draft

|  | Descriptor |
|---|---|
| access_unit_delimiter_rbsp( ) { | |
| pic_type | u(3) |
| rbsp_trailing_bits( ) | |
| } | |

Access Unit Delimiter RBSP Semantics

The access unit delimiter is used to indicate the start of an access unit and the type of slices present in the coded pictures in the access unit containing the access unit delimiter NAL unit. There is no normative decoding process associated with the access unit delimiter.

pic_type indicates that the slice_type values for all slices of the coded pictures in the access unit containing the access unit delimiter NAL unit are members of the set listed in Table 7-3 for the given value of pic_type. The value of pic_type shall be equal to 0, 1 or 2 in bitstreams conforming to this version of this Specification. Other values of pic_type are reserved for future use by ITU T| ISO/IEC. Decoders conforming to this version of this Specification shall ignore reserved values of pic_type.

TABLE 7-3

Interpretation of pic_type

| pic_type | slice_type values that may be present in the coded picture |
|---|---|
| 0 | I |
| 1 | P, I |
| 2 | B, P, I |

Layers, Dependent, and Independent Layers

Layers are defined in VVC as a set of VCL NAL units that all have a particular value of nuh_layer_id and the associated non-VCL NAL units.

A coded layer video sequence (CLVS) in the current version of VVC is defined as a sequence of PUs that consists, in decoding order, of a CLVS start (CLVSS) PU, followed by zero or more PUs that are not CLVSS PUs, including all subsequent PUs up to but not including any subsequent PU that is a CLVSS PU.

The relation between the PU, AU, and CLVS is illustrated in FIG. 1.

In the current version of VVC, layers may be coded independently or dependently from each other. When the layers are coded independently, a layer with one nuh_layer_id value (e.g., nuh_layer_id 0) may not predict video data from another layer with a different nuh_layer_id value (e.g. nuh_layer_id 1). In the current version of VVC, dependent coding between layers may be used, which enables support for scalable coding with SNR, spatial and view scalability.

Picture Order Count (POC)

Pictures in HEVC are identified by their picture order count (POC) values, also known as full POC values. Each slice contains a code word, pic_order_cnt_lsb, that shall be the same for all slices in a picture. pic_order_cnt_lsb is also known as the least significant bits (lsb) of the full POC since it is a fixed-length code word and only the least significant bits of the full POC is signaled. Both encoder and decoder keep track of POC and assign POC values to each picture that is encoded/decoded. The pic_order_cnt_lsb can be signaled by 4-16 bits. There is a variable MaxPicOrderCntLsb used in HEVC, which is set to the maximum pic_order_cnt_lsb value plus 1. This means that if 8 bits are used to signal pic_order_cnt_lsb, the maximum value is 255 and MaxPicOrderCntLsb is set to 2^8=256. The picture order count value of a picture is called PicOrderCntVal in HEVC. Usually, PicOrderCntVal for the current picture is simply called PicOrderCntVal. POC is expected to work in a similar way in the final version of VVC.

Intra Random Access Point (IRAP) Pictures and the Coded Video Sequence (CVS)

An intra random access point (IRAP) picture in HEVC is a picture that does not refer to any picture other than itself for prediction in its decoding process. The first picture in the bitstream in decoding order in HEVC must be an IRAP picture, but an IRAP picture may additionally also appear later in the bitstream. HEVC specifies three types of IRAP pictures: the broken link access (BLA) picture, the instantaneous decoder refresh (IDR) picture, and the clean random access (CRA) picture.

A coded video sequence (CVS) in HEVC is a sequence of access units starting at an IRAP access unit followed by zero or more AUs up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder because they may not be decodable as they may contain references to pictures that are not present in the bitstream. A CRA may start a CVS.

In the current version of the VVC draft, a CVS is a sequence of access units starting at a CVS start (CVSS) access unit followed by zero or more AUs up to, but not including the next CVSS access unit in decoding order. A CVSS access unit may contain an IRAP picture, i.e., an IDR or a CRA picture, or a gradual decoding refresh (GDR) picture. A CVS may contain one or more CLVSs.

GDR pictures are essentially used for random access in bitstreams encoded for low-delay coding where a full IRAP picture would cause too much delay. A GDR picture may use gradual intra refresh that updates the video picture by picture where each picture is only partially intra coded. It is signaled with the GDR picture when the video is fully refreshed and ready for output, given that the bitstream was decoded from the GDR picture. A GDR picture in VVC may start a CVS or CLVS. GDR pictures are included in the current VVC draft but are not a normative part of the HEVC standard, where it instead may be indicated with an SEI message.

Slice

The concept of slices in HEVC divides the picture into independently coded slices, where decoding of one slice in a picture is independent of other slices of the same picture. In a previous version of the VVC draft specification, slices were referred to as tile groups.

One purpose of slices is to enable resynchronization in case of data loss. In HEVC, a slice is a set of CTUs. Slices are also supported in the current version of VVC, and a VVC picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit.

Each slice has a slice type which defines the coding type (i.e. type of prediction) used by the slice, i.e. whether a slice is an intra prediction coded I slice, uni-directional prediction coded P slice, or a bi-directional prediction coded B slice. The slice type is signaled with a slice_type syntax element in the slice header that may have one of the following values:

TABLE 4

Name association to slice_type

| slice_type | Name of slice_type |
| --- | --- |
| 0 | B (B slice) |
| 1 | P (P slice) |
| 2 | I (I slice) |

A picture could consist of slices of different slice types. However, a picture with a certain pic_type value or NAL unit type may be limited to only support I slices or only support I slices and P slices. For instance, a picture with an IRAP NAL unit type or a picture with pic_type equal to 0 in the AUD shall only contain I slices, and a picture with pic_type equal to 1 in the AUD may only contain I slices and P slices, whereas a picture with pic_type equal to 2 may contain slices of any slice_type (i.e. I slices, P slices or B slices).

The parts of the slice header syntax in the current version of VVC that are relevant to this invention are shown below.

TABLE 5

Slice header syntax

| | Descriptor |
| --- | --- |
| slice_header( ) { | |
|   picture_header_in_slice_header_flag | u(1) |
|   if( picture_header_in_slice_header_flag ) | |
|     picture_header_structure( ) | |
|   ... | |
|   if( ph_inter_slice_allowed_flag ) | |
|     slice_type | ue(v) |
|   ... | |
| } | |

Subpictures

The concept of subpictures is supported in the current version of VVC. A subpicture is defined as a rectangular region of one or more slices within a picture. This means a subpicture contains one or more slices that collectively cover a rectangular region of a picture.

Subpictures may be used to more easily perform extraction and merging operations of picture partitions in a video bitstream, such as for viewport dependent 360 video streaming, without having to go through complicated means to verify the independence of the picture partitions.

In the current version of the VVC draft specification, the location and size of the subpictures are signaled in the SPS. Boundaries of a subpicture region may be treated as picture boundaries (excluding in-loop filtering operations) conditioned to a per-subpicture flag subpic_treated_as_pic_flag[i] in the SPS. Also loop-filtering on subpicture boundaries is conditioned to a per-subpicture flag loop_filter_across_subpic_enabled_flag[i] in the SPS.

There is also a subpicture ID mapping mechanism signaled in the SPS for the subpictures which is gated by two flags sps_subpic_id_present_flag and sps_subpic_id_signalling_present_flag.

Reference Picture Lists

In VVC, reference picture lists (RPLs) are signaled for a current picture to indicate which previously decoded pictures the decoder should keep for reference for decoding the current and future pictures. There are two RPLs for each picture. For inter-prediction only from one picture (P-prediction), only the first RPL is used. For inter-prediction from two pictures (B-prediction), both the first and the second RPLs is used. That an entry is active in a RPL means that the reference picture in the entry is used to decode the current picture. If the reference picture in an entry is not going to be used to predict the current picture but is used to predict a later picture, the entry should be kept in the RPL but inactive in the RPL of the current picture.

Parameter Sets

HEVC and VVC specifies three types of parameter sets, the picture parameter set (PPS), the sequence parameter set (SPS), and the video parameter set (VPS). The PPS contains data that is common for a whole picture, the SPS contains data that is common for a coded video sequence (CVS), and the VPS contains data that is common for multiple CVSs (e.g. data for multiple layers in the bitstream).

The current version of VVC also specifies one additional parameter set, the adaptation parameter set (APS). APS carries parameters needed for the adaptive loop filter (ALF) tool and the luma mapping and chroma scaling (LMCS) tool.

Decoding Capability Information (DCI)

Decoding Capability Information (DCI) specifies information that may not change during the decoding session and may be good for the decoder to know about (e.g. the maximum number of allowed sub-layers). The information in DCI is not necessary for operation of the decoding process. In previous drafts of the VVC specification, the DCI was called decoding parameter set (DPS).

The decoding capability information also contains a set of general constraints for the bitstream. The set of general constraints gives the decoder information of what to expect from the bitstream, in terms of coding tools, types of NAL units, etc. In the current version of VVC, the general constraint information could also be signaled in VPS or SPS.

Picture Header Structure

In the current version of VVC, a coded picture contains a picture header structure. The picture header structure contains syntax elements that are common for all slices of the associated picture. The picture header structure may be signaled in its own NAL unit with NAL unit type PH NUT or included in the slice header given that there is only one slice in the coded picture. This is indicated by the slice header syntax element picture_header_in_slice_header_flag, where a value equal to 1 specifies that the picture header structure is included in the slice header, and a value equal to 0 specifies that the picture header structure is carried in its own NAL unit. For a CVS where not all pictures are single-slice pictures, each coded picture must be preceded by a picture header structure that is signaled in its own NAL unit. HEVC does not support picture header structures.

The parts of the picture header structure syntax in the current version of VVC that are relevant to this invention are shown below.

TABLE 6

Parts of the picture header structure syntax

| | Descriptor |
|---|---|
| picture_header_structure( ) { | |
| ... | |
| ph_inter_slice_allowed_flag | u(1) |
| if( ph_inter_slice_allowed_flag ) | |
| ph_intra_slice_allowed_flag | u(1) |
| ... | |
| if( ph_intra_slice_allowed_flag ) { | |
| ... | |
| } | |
| if( ph_inter_slice_allowed_flag ) { | |
| ... | |
| if( cu_qp_delta_enabled_flag ) | |
| ph_cu_qp_delta_subdiv_inter_slice | ue(v) |
| if( pps_cu_chroma_qp_offset_list_enabled_flag ) | |
| ph_cu_chroma_qp_offset_subdiv_inter_slice | ue(v) |
| if( sps_temporal_mvp_enabled_flag ) { | |
| ph_temporal_mvp_enabled_flag | u(1) |
| if( ph_temporal_mvp_enabled_flag && | |
| rpl_info_in_ph_flag ) { | |
| ph_collocated_from_l0_flag | u(1) |
| if( ( ph_collocated_from_l0_flag && | |
| num_ref_entries[ 0 ][ RplsIdx[ 0 ] ] > 1 ) \|\| | |
| ( !ph_collocated_from_l0_flag && | |
| num_ref_entries[ 1 ][ RplsIdx[ 1 ] ] > 1 ) ) | |
| ph_collocated_ref_idx | ue(v) |
| } | |
| } | |
| mvd_l1_zero_flag | u(1) |
| if( sps_fpel_mmvd_enabled_flag ) | |
| ph_fpel_mmvd_enabled_flag | u(1) |
| if( sps_bdof_pic_present_flag ) | |
| ph_disable_bdof_flag | u(1) |
| if( sps_dmvr_pic_present_flag ) | |
| ph_disable_dmvr_flag | u(1) |
| if( sps_prof_pic_present_flag ) | |
| ph_disable_prof_flag | u(1) |
| if( ( pps_weighted_pred_flag \|\| | |
| pps_weighted_bipred_flag ) && | |
| wp_info_in_ph_flag ) | |
| pred_weight_table( ) | |
| } | |
| ... | |
| } | |

SUMMARY

One problem with the existing solution in VVC is that the slice type is signaled in the slice header even when it does not need to be signaled, which causes an unnecessary bit cost.

Another problem with the existing solution in VVC is that tools that are used only for bi-directional prediction such as bi-directional optical flow (BDOF), decoder motion vector refinement (DMVR), and weighted prediction, may be turned on in the picture header structure despite bi-directional coded slices not being allowed in the coded picture. Sending the syntax elements for these tools is not necessary and also causes an unnecessary bit cost. Signaling of syntax elements that has no meaning is confusing and, in general, should avoided.

Yet another problem with the existing solution in VVC is that it is not very straightforward in VVC to determine whether a coded picture is a bi-directional inter coded picture or not. Determining whether a coded picture is a bi-directional inter coded picture requires checking that at least one slice in the coded picture has a slice_type equal to 0 (B slice) or not. That may require a buffering of NAL units which would not be necessary if the picture type is always signaled in the beginning of the coded picture.

Aspects of the invention overcome one or more of these problems by decoding a segment (e.g. a slice) of a coded picture from a bitstream by decoding a codeword and obtaining a value of the codeword that specifies whether there may be bi-directional inter coded slices in the coded picture or not. Based on the value of the codeword, one or more parameter values are derived by either inferring them or decoding one or more parameters from the bitstream to obtain the parameter values, where the one or more parameter values are used to decode the segment.

In a first embodiment, a generic solution is described for decoding the segment by decoding a first codeword (e.g., from the picture header structure) to obtain a value of the first codeword, which indicates whether there may be bi-directional inter coded slices in the coded picture or not. Optionally, a second, third, and/or fourth codewords are also decoded, and to obtain value(s) of the second, third, and/or fourth codewords, which may indicate (i) whether the coded picture may or may not comprise intra coded slices and/or inter coded slices and/or (ii) whether the picture header structure is included in the slice header or not. Based on the value of the first codeword (and optionally on the value of one or more of the second, third, and fourth codewords), one or more parameter values may be derived by either inferring them or obtaining them from one or more decoded parameters, and the one or more parameter values may be used to decode the segment.

In the second embodiment, a segment type, e.g. a slice type, of the segment may be inferred from the value of the first codeword (and optionally also from the value(s) of one or more of the second, third, and fourth codewords).

In the third embodiment, parameter values may be derived from one or more decoded parameters (e.g. from the picture header structure) based on the value of the first codeword.

Aspects of the invention may provide the advantage that the current solution is that the slice type can be derived instead of explicitly signaled when it does not need to be explicitly signaled. This saves some bits.

Aspects of the invention may additionally or alternatively provide the advantage that the syntax elements in the picture header structure that may be used only by bi-directional inter coded slices may be grouped and conditioned on the value of the first codeword. Conditioning the syntax elements in the picture header structure for these tools on the first codeword may prevent signaling the syntax elements when there are no bi-directional inter coded slices in the coded picture associated with the picture header structure. This may save some bits and may effectively prevent enabling bi-prediction tools when these cannot be used for the coded picture. Thus, the signaling of syntax elements that have no meaning, which is confusing, may be avoided.

In some aspects, the value of the first codeword may additionally or alternatively provide an easy way to check whether a coded picture is a bi-directional inter coded picture or not. In some aspects, use of the value of the first codeword may enable checking whether a coded picture is a bi-directional inter coded picture or not without buffering all NAL units of a picture.

One aspect of the invention may provide a method for decoding a segment in a coded picture from a bitstream. The method may include decoding a first codeword from the bitstream to obtain a value of the first codeword. The value of the first codeword may indicate whether the coded picture may contain bi-directional inter coded segments or not. The method may include, based on the value of the first codeword, deriving one or more parameter values by either (a) decoding one or more parameters from the bitstream to obtain the one or more parameter values or (b) inferring the one or more parameter values. The method may include decoding the segment in the coded picture based on the one or more parameter values.

In some aspects, the first codeword may be decoded from a picture header structure associated with the coded picture. In some aspects, the picture header structure may be included in a picture header network abstraction layer (NAL) unit or in a segment header of the segment. In some aspects, the first codeword may be decoded from a portion of the bitstream other than the segment. In some aspects, the first codeword may be decoded from decoding capability information, an access unit delimiter, or a parameter set (e.g., a sequence parameter set, a video parameter set, or a coded picture parameter set). In some aspects, the first codeword may be decoded from a portion of the bitstream other than an access unit delimiter.

In some aspects, the segment may have a segment type, and one or more of the one or more parameter values indicate the segment type of the segment. In some aspects, the segment type indicates whether the segment is an intra (I) coded segment, a uni-directional (P) inter coded segment, or a bi-directional (B) inter coded segment.

In some aspects, the method may further include decoding a second codeword from the bitstream to obtain a value of the second codeword, the value of the second codeword may indicate whether the coded picture may contain intra coded segments or not, and deriving the one or more parameter values may be based on the values of the first and second codewords. In some aspects, the method may further include decoding a third codeword from the bitstream to obtain a value of the third codeword, the value of the third codeword may indicate whether the coded picture may contain inter coded segments or not, and deriving the one or more parameter values may be further based on the value of the third codeword. In some alternative aspects, the method may further include decoding a third codeword from the bitstream to obtain a value of the third codeword, the value of the third codeword may indicate whether the coded picture may contain uni-predicted inter coded segments or not, and deriving the one or more parameter values may be further based on the value of the third codeword. In some aspects, at least one of the second and third codewords may be decoded from the picture header structure associated with the coded picture, decoding capability information, an access unit delimiter, or a parameter set (e.g., a sequence parameter set, a video parameter set, or a picture parameter set).

In some aspects, the segment may have a segment type, and deriving the one or more parameter values may include inferring one or more parameter values (e.g., slice_type) that indicate that the segment type is a uni-directional (P) inter coded segment for one or more values that specify that the segment is a uni-directional inter coded segment if (i) the value of the first codeword indicates that the coded picture may not contain bi-directional inter coded segments, (ii) the value of the second codeword indicates that the coded picture may not contain intra coded segments, and (iii) the third codeword indicates that the coded picture may contain inter coded segments.

In some aspects, the segment may have a segment type, and deriving the one or more parameters values include: (1) inferring one or more parameter values (e.g., slice_type) that indicate that the segment type is an intra (I) coded segment for one or more values that specify that the segment is an intra coded segment if the value of the third codeword indicates that the coded picture may not contain inter coded slices; (2) inferring one or more parameter values (e.g., slice_type) that indicate that the segment type is a uni-directional (P) inter coded segment for one or more values that specify that the segment is a uni-directional inter coded segment if (i) the value of the third codeword indicates that the coded picture may contain inter coded slices and (ii) the value of the first codeword indicates that the coded picture may not contain bi-directional inter coded slices; and (3) inferring one or more parameter values (e.g., slice_type) that indicate that the segment type is a bi-directional (B) inter coded segment for one or more values that specify that the segment type is a bi-directional inter coded segment if (i) the value of the third codeword indicates that the coded picture may contain inter coded slices and (ii) the value of the first codeword indicates that the coded picture may contain bi-directional inter coded slices.

In some aspects, the method may further include decoding a fourth codeword from the bitstream to obtain a value of the fourth codeword, the value of the fourth codeword may indicate whether a picture header structure associated with the coded picture is decoded from the same network abstraction layer (NAL) unit as the segment or from a picture header NAL unit different from the segment NAL unit, and deriving the one or more parameter values may be further based on the value of the fourth codeword. In some aspects, the fourth codeword may be decoded from a segment header in the segment, decoding capability information, an access unit delimiter, or a parameter set such as a sequence parameter set, a video parameter set, or a picture parameter set. In some aspects, the fourth codeword may be decoded from a picture parameter set. In some aspects, if the value of the fourth codeword indicates that the picture header structure associated with the coded picture is decoded from the same NAL unit as the segment, the one or more parameters values may be derived by inferring the one or more parameter values. In some aspects, if the value of the fourth codeword indicates that the picture header structure associated with the coded picture is decoded from a picture header NAL unit different from the segment NAL unit, the one or more parameter values may be derived by decoding one or more parameters from the bitstream to obtain the one or more parameter values.

In some aspects, the one or more parameter values may be derived by decoding one or more parameters from the bitstream to obtain the one or more parameter values if the value of the first codeword indicates that the coded picture shall not contain bi-directional inter coded segments, and the one or more parameter values may be derived by inferring the one or more parameter values if the value of the first codeword indicates that the coded picture may contain bi-directional inter coded segments. In some aspects, decoding the one or more parameters from the bitstream to obtain the one or more parameter values may include decoding the one or more parameters from a picture header structure associated with the coded picture, a segment header of the segment, decoding capability information, an access unit delimiter, or a parameter set (e.g., a sequence parameter set, a video parameter set, or a picture parameter set).

In some aspects, the one or more parameters may be one or more of a collocated from L0 flag, a motion vector difference (MVD) L1 zero flag, a flag for enabling/disabling bi-directional optical flow (BDOF), a flag for enabling/disabling decoder motion vector refinement (DMVR), and weighted prediction parameters. In some aspects, the first codeword may be a flag. In some aspects, one or more of the second, third, and fourth codewords may be flags. In some aspects, two or more of the first, second, third, and fourth codewords may be the same codeword.

In some aspects, the segment may be a slice. In some aspects, the slice may have a slice type, and one or more of the one or more parameter values may indicate the slice type of the slice.

In some aspects, inferring the one or more parameter values may include inferring one or more values that are either constant values or values that are derived without decoding any of the one or more parameters from the bitstream.

In some aspects, the coded picture may be either (a) a coded picture that may contain bi-directional inter coded segments, which is a coded picture that may contain segments of a type that specifies that a segment may contain blocks that are predicted using bi-directional inter prediction, or (b) a coded picture that may not contain bi-directional inter coded segments, which is a coded picture that does not contain any segment of a type that specifies that a segment may contain blocks that are predicted using bi-directional inter prediction. In some aspects, the coded picture may be either (a) a coded picture that may contain intra coded segments, which is a coded picture that may contain segments of a type that specifies that the segments only contain blocks that are predicted using intra prediction, or (b) a coded picture that may not contain intra coded segments, which is a coded picture that does not contain any segment of a type that specifies that the segments only contain blocks that are predicted using intra prediction.

In some aspects, the coded picture may be either (a) a coded picture that may contain inter coded segments, which is a coded picture that may contain segments of types that specify that a segment may contain blocks that are predicted using one or both of bi-directional inter prediction and uni-directional inter prediction, (b) a coded picture that may not contain inter coded segments, which is a coded picture that does not contain any segment of any type that specifies that the segment may contain any block that is predicted using bi-directional inter prediction or uni-directional inter prediction. In some aspects, the coded picture may be either (a) a coded picture that may contain uni-predicted inter coded segments, which is a coded picture that may contain segments of a type that specifies that a segment may contain blocks that are predicted using uni-predicted inter prediction, or (b) a coded picture that may not contain uni-predicted inter coded segments, which is a coded picture that does not contain any segment of a type that specifies that a segment may contain blocks that are predicted using uni-predicted inter prediction.

Another aspect of the invention may provide an apparatus configured to decode a first codeword from a bitstream to obtain a value of the first codeword. The value of the first codeword may indicate whether a coded picture may contain bi-directional inter coded segments or not. The apparatus may be configured to, based on the value of the first codeword, derive one or more parameter values by either (a) decoding one or more parameters from the bitstream to obtain the one or more parameter values or (b) inferring the one or more parameter values. The apparatus may be configured to decode a segment of the coded picture based on the one or more parameter values.

Yet another aspect of the invention may provide a method for decoding a segment in a coded picture from a bitstream. The method may include determining whether the coded picture may contain inter coded segments or not by decoding a first syntax element from a syntax structure in the bitstream. The method may include, in response to determining that the coded picture may contain inter coded segments, (i) determining whether the coded picture may contain intra coded segments or not by decoding a second syntax element from a syntax structure in the bitstream and (ii) determining whether the coded picture may contain bi-directional inter coded segments or not by decoding a third syntax element from a syntax structure in the bitstream. The method may include, in response to determining that the coded picture may not contain inter coded segments, determining that the coded picture may only contain intra coded segments without decoding the second syntax element and without decoding the third syntax element. The method may include, in response to determining that the coded picture may contain bi-directional inter coded segments, deriving one or more parameter values by decoding one or more parameters from the bitstream to obtain the one or more parameter values. The method may include, in response to determining that the coded picture may not contain bi-directional inter coded segments from the decoding of the third syntax element, deriving the one or more parameter values by inferring the one or more parameter values. The method may include decoding the segment of the coded picture using the one or more parameter values.

In some aspects, the one or more parameters may include one or more of a collocated from L0 flag, a motion vector difference (MVD) L1 zero flag, a flag for enabling/disabling bi-directional optical flow (BDOF), and a flag for enabling/disabling decoder motion vector refinement (DMVR). In some aspects, inferring the one or more parameter values may include inferring one or more of (i) the value of the collocated from L0 flag as equal to 1, (ii) the value of the motion vector difference (MVD) L1 zero flag as equal to 0; (iii) the value of the flag for enabling/disabling bi-directional optical flow (BDOF) as equal to a value representing that BDOF is disabled, and (iv) the value of the flag for enabling/disabling decoder motion vector refinement (DMVR) as equal to a value representing that DMVR is disabled. In some aspects, the syntax structure may be present in a picture header NAL unit of the coded picture or in a slice header of the coded picture.

In some aspects, the method may further include decoding a fourth syntax element representing a slice type if (ph_inter_slice_allowed_flag && !picture_header_in_slice_header_flag &&
 (ph_intra_slice_allowed_flag||ph_inter_B_slice_allowed_flag)),
where the ph_inter_slice_allowed_flag may be the first syntax element, the ph_intra_slice_allowed_flag may be the second syntax element, ph_inter_B_slice_allowed_flag may be the third syntax element, and the picture_header_in_slice_header_flag may be a syntax element indicating whether the syntax structure is present in a picture header NAL unit of the coded picture or in a slice header of the coded picture.

In some aspects, the method may further include inferring a slice_type value without decoding a corresponding slice_type syntax element if the following condition is not met: (ph_inter_slice_allowed_flag && !picture_header_in_slice_header_flag &&
 (ph_intra_slice_allowed_flag||ph_inter_B_slice_allowed_flag)),
where the ph_inter_slice_allowed_flag is the first syntax element, the ph_intra_slice_allowed_flag is the second syntax element, ph_inter_B_slice_allowed_flag is the third syntax element, and the picture_header_in_slice_header_flag is a syntax element indicating whether the syntax structure is present in a picture header NAL unit of the coded picture or in a slice header of the coded picture.

In some aspects, the slice_type may be inferred to be an intra (I) coded segment if the ph_inter_slice_allowed_flag is equal to 0; the slice_type may be inferred to be a uni-directional (P) inter coded segment if the ph_inter_slice_allowed_flag is equal to 1 and the ph_inter_B_slice_allowed_flag is equal to 0; and the slice_type may be inferred to be a bi-directional (B) inter coded segment if the ph_inter_slice_allowed_flag is equal to 1 and the ph_inter_B_slice_allowed_flag is equal to 1.

In some aspects, the segment may be a slice.

In some aspects, the one or more parameters include a prof_flag that specifies whether a prediction refinement using optical flow may be used in an affine motion compensation process when decoding the coded picture or not.

Still another aspect of the invention may provide an apparatus configured to determine whether a coded picture in a bitstream may contain inter coded segments or not by decoding a first syntax element from a syntax structure in the bitstream. The apparatus may be configured to, in response to determining that the coded picture may contain inter coded segments, (i) determine whether the coded picture may contain intra coded segments or not by decoding a second syntax element from a syntax structure in the bitstream and (ii) determine whether the coded picture may contain bi-directional inter coded segments or not by decoding a third syntax element from a syntax structure in the bitstream. The apparatus may be configured to, in response to determining that the coded picture may not contain inter coded segments, determine that the coded picture may only contain intra coded segments without decoding the second syntax element and without decoding the third syntax element. The apparatus may be configured to, in response to determining that the coded picture may contain bi-directional inter coded segments, derive one or more parameter values by decoding one or more parameters from the bitstream to obtain the one or more parameter values. The apparatus may be configured to, in response to determining that the coded picture may not contain bi-directional inter coded segments from the decoding of the third syntax element, derive the one or more parameter values by inferring the one or more parameter values. The apparatus may be configured to decode a segment of the coded picture using the one or more parameter values.

Yet another aspect of the invention may provide a method for encoding a segment in a picture to a bitstream. The method may include determining whether the coded picture will contain bi-directional inter coded segments or not. The method may include encoding a first codeword to the bitstream. The encoded first codeword may have a value that indicates whether the coded picture will contain bi-directional inter coded segments or not. The method may include determining whether to encode one or more parameter values in the bitstream based on the determination of whether the coded picture will contain bi-directional inter coded segments or not. The method may include encoding the one or more parameter values in the bitstream if determined to encode the one or more parameter values in the bitstream. The method may include encoding the segment in the picture to the bitstream using the one or more parameter values.

Still another aspect of the invention may provide an apparatus configured to determine whether a coded picture may contain bi-directional inter coded segments or not. The apparatus may be configured to encode a first codeword to a bitstream. The encoded first codeword may have a value that indicates whether the coded picture may contain bi-directional inter coded segments or not. The apparatus may be configured to determine whether to encode one or more parameter values in the bitstream based on the determination of whether the coded picture may contain bi-directional inter coded segments or not. The apparatus may be configured to encode the one or more parameter values in the bitstream if determined to encode the one or more parameter values in the bitstream. The apparatus may be configured to encode a segment in the picture to the bitstream using the one or more parameter values.

Yet another aspect of the invention may provide a method for encoding a segment of a current picture into a coded picture in a bitstream. The method may include determining whether the coded picture may contain inter coded segments or not. The method may include encoding a first syntax element to the bitstream using a syntax structure. The encoded first syntax element may have a value that indicates whether the coded picture may contain inter coded segments or not. The method may include, in response to determining that the coded picture may contain inter coded segments, (i) determining whether the coded picture may contain intra coded segments or not, (ii) encoding a second syntax element to the bitstream using a syntax structure, the second syntax element having a value that indicates whether the coded picture will contain intra coded segments or not, (iii) determining whether the coded picture may contain bi-directional inter coded segments or not, and (iv) encoding a third syntax element to the bitstream using a syntax structure, the third syntax element having a value that indicates whether the coded picture may contain bi-directional inter coded segments or not. The method may include, in response to determining that the coded picture may not contain inter coded segments, (i) determining that the coded picture will only contain intra coded segments and (ii) determining to not encode the second and third syntax elements in the bitstream. The method may include, in response to determining that the coded picture may contain bi-directional inter coded segments, encoding one or more parameter values in the bitstream. The method may include, in response to determining that the coded picture may not contain bi-directional inter coded segments from the decoding of the third syntax element, determining to not encode the one or more parameter values in the bitstream. The method may include, encoding the segment of the current picture in the bitstream using the one or more parameter values.

Still another aspect of the invention may provide an apparatus configured to determine whether a coded picture may contain inter coded segments or not. The apparatus may be configured to encode a first syntax element to a bitstream using a syntax structure. The encoded first syntax element may have a value that indicates whether the coded picture may contain inter coded segments or not. The apparatus may be configured to, in response to determining that the coded picture may contain inter coded segments, (i) determine whether the coded picture may contain intra coded segments or not, (ii) encode a second syntax element to the bitstream using a syntax structure, the second syntax element having a value that indicates whether the coded picture will contain intra coded segments or not, (iii) determine whether the coded picture may contain bi-directional inter coded segments or not, and (iv) encode a third syntax element to the bitstream using a syntax structure, the third syntax element having a value that indicates whether the coded picture may contain bi-directional inter coded segments or not. The apparatus may be configured to, in response to determining that the coded picture may not contain inter coded segments, (i) determine that the coded picture will only contain intra coded segments and (ii) determine to not encode the second and third syntax elements in the bitstream. The apparatus may be configured to, in response to determining that the coded picture may contain bi-directional inter coded segments, encode one or more parameter values in the bitstream. The apparatus may be configured to, in response to determining that the coded picture may not contain bi-directional inter coded segments from the decoding of the third syntax element, determine to not encode the one or more parameter values in the bitstream. The apparatus may be configured to encode a segment of the current picture in the bitstream using the one or more parameter values.

Yet another aspect of the invention may provide a computer program comprising instructions for adapting an apparatus to perform the method of any of the aspects described above.

Still another aspect of the invention may provide a carrier containing the computer program described above, and the carrier may be one of an electronic signal, optical signal, radio signal, or compute readable storage medium.

Yet another aspect of the invention may provide an apparatus. The apparatus may include processing circuitry and a memory. The memory may contain instructions executable by said processing circuitry, whereby said apparatus is operative to perform the method of any of the aspects described above.

Still another aspect of the invention may provide any combination of the aspects set forth above.

BRIEF DESCRIPTION OF THE DRAWINGS

The accompanying drawings, which are incorporated herein and form part of the specification, illustrate various embodiments.

DETAILED DESCRIPTION

Terminology

In this disclosure, the term "segment" may refer to a slice, a tile, a tile group, a block, a coding tree unit (CTU), a coding unit (CU), a subpicture, a frame, a picture, a field, or similar concept describing a part of a picture or a full picture in a video. In this disclosure, the term "segment header" may thus, for example and without limitation, refer to slice header, tile header, tile group header, subpicture header, frame header, picture header structure, or field header. In one example, the term "segment" may refer to a slice, and the term "segment header" may refer to a slice header. Note that a picture may consist of one single slice.

In this disclosure, the term intra (I) coded segment is used interchangeably with intra (I) segment, the term uni-directional (P) inter coded segment is used interchangeably with predictive (P) segment, and the term bi-directional (B) inter coded segment is used interchangeably with bi-predictive (B) segment. The term inter coded segments may comprise both uni-directional (P) inter coded segments and bi-directional (B) inter coded segments. An intra (I) coded segment shall only contain intra coded coding units. A uni-directional (P) inter coded segment may contain both intra coded and uni-directional (P) inter coded coding units. A bi-directional (B) inter coded segment may contain intra coded, uni-directional (P) inter coded, and bi-directional (B) inter coded coding units.

The terms codeword, syntax element, and parameter are used interchangeably in this disclosure and refer to a set of one or more continuous bits in the bitstream that may be decoded to a specific value. A parameter value is defined as a syntax element value or a value derived or inferred based on one or more syntax element values. A value may be inferred to be equal to a value derived from one or more syntax elements, or a value may be inferred to be equal to a constant value. The term "deriving a value" in this disclosure is used to mean either "deriving a value from a parameter" or "inferring a value".

Bitstream

Figure 1:
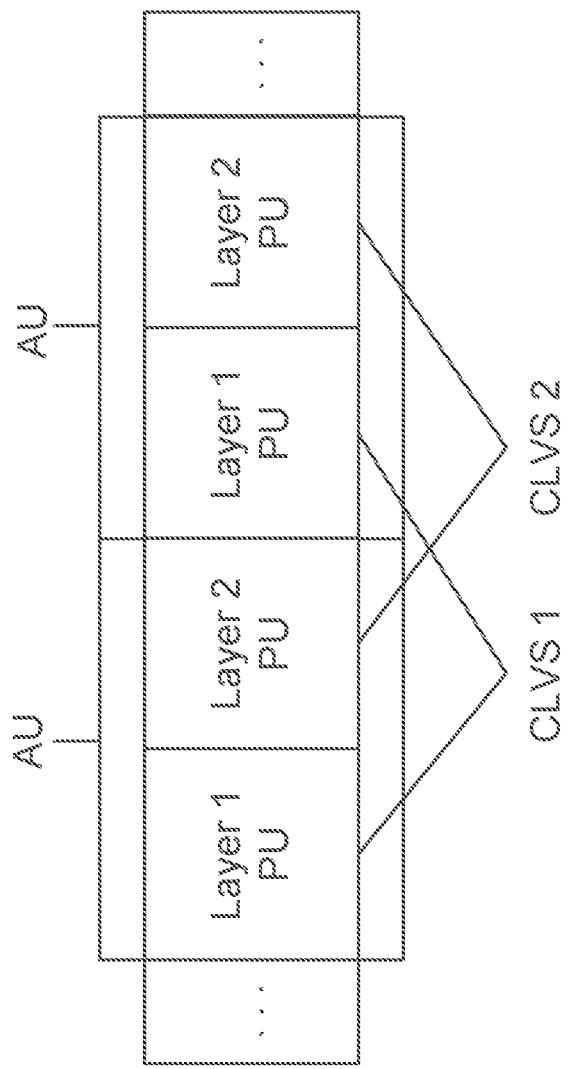
FIG. 1 illustrates the relation between the PU, AU, and CLVS.
Figure 2:
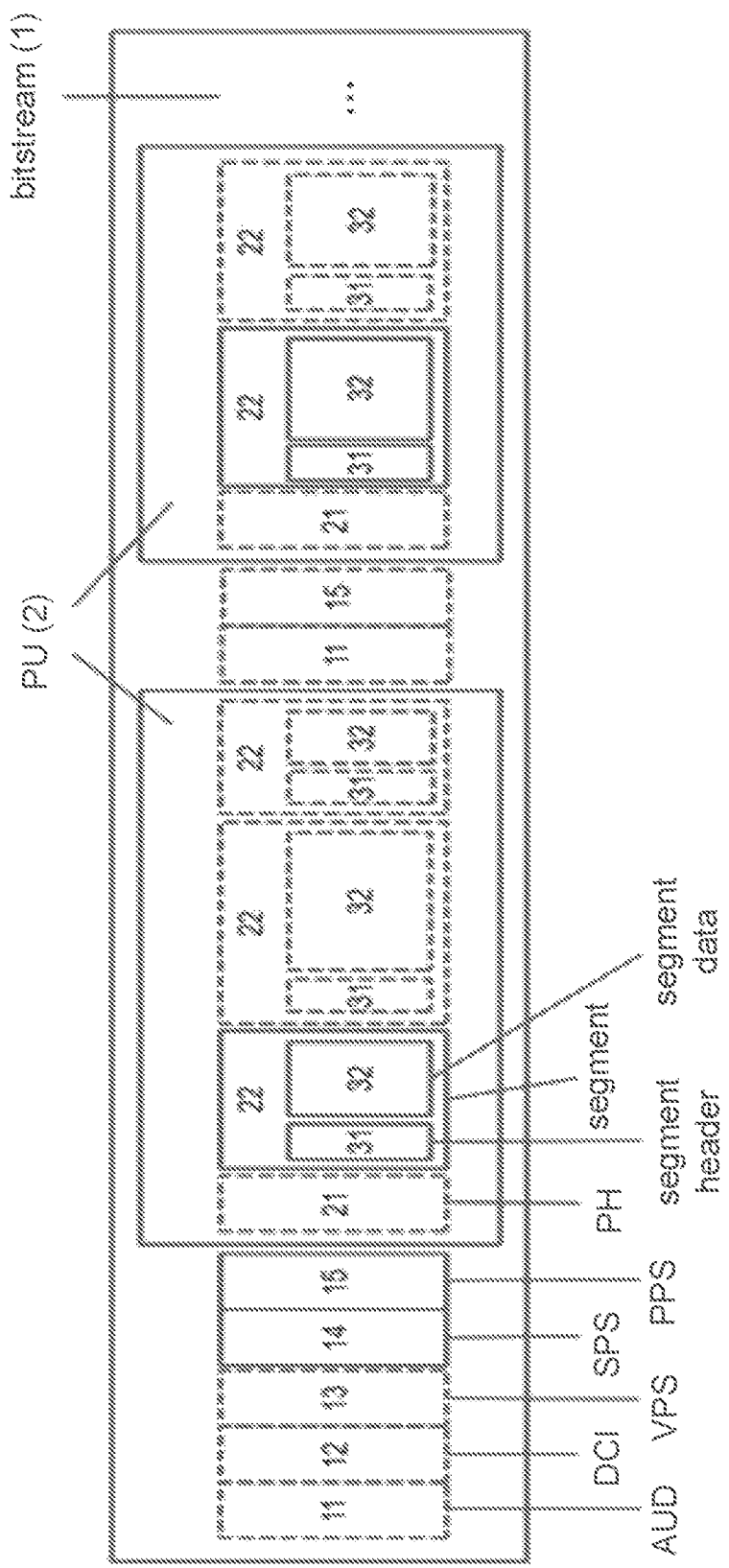
FIG. 2 illustrates a bitstream according to some embodiments.

FIG. 2 illustrates a bitstream 1 in accordance with some aspects of the invention. Dashed lines in FIG. 2 indicate that the element is optional in Versatile Video Coding (VVC). A bitstream 1 carries one or more coded pictures. The set of network abstraction layer (NAL) units associated with a coded picture is in the current version of VVC referred to as a picture unit (PU) 2. A VVC bitstream may start with decoding capability information (DCI) (12) followed by a video parameter set (VPS) 13, a sequence parameter set (SPS) 14, and a picture parameter set (PPS) 15 in the beginning of each coded video sequence (CVS). A PPS 15 may also be signaled before any coded picture. A PU 2 includes one or more coded segments 22. A coded segment 22 includes a segment header 31 and segment data 32. A PU 2 includes one picture header structure (PH) 21. Thus, a picture header structure is associated to one coded picture. In the current version of VVC, where the segment is a slice, the PH 21 may be signaled in its own NAL unit or in the same NAL unit as a slice 22, more specifically in the slice header 31. An access unit delimiter (AUD) 11 may optionally be signaled as the first NAL unit in an access unit.

Although the invention is mainly described by terms used in VVC, it is to be understood by a person skilled in the art that the invention may also be applicable to other current and future video codecs.

System

Figure 3:
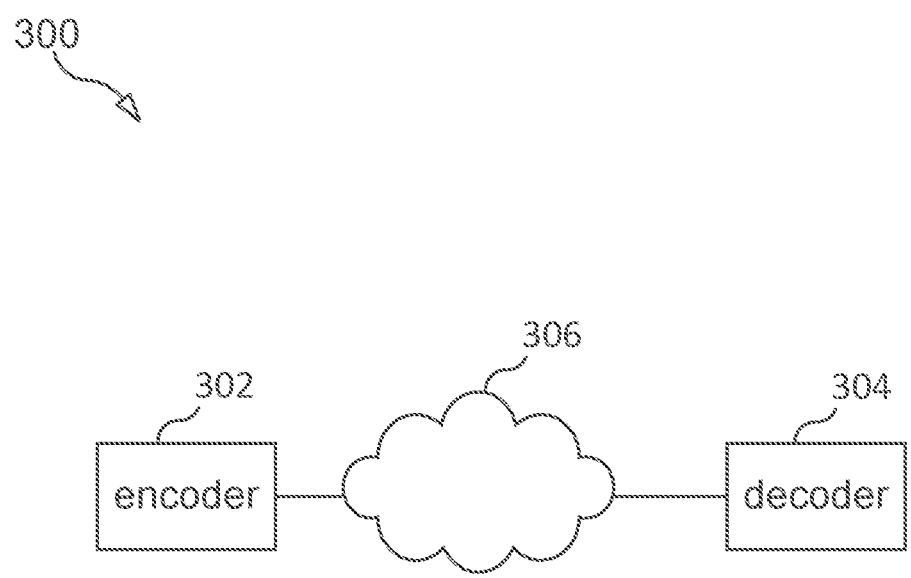
FIG. 3 is a block diagram of a system according some embodiments.

FIG. 3 illustrates a system 300 according to an example embodiment. System 300 includes an encoder 302 and a decoder 304. In the example shown, decoder 304 can receive via a network 306 (e.g., the Internet or other network) encoded images produced by encoder 302.

Figure 4:
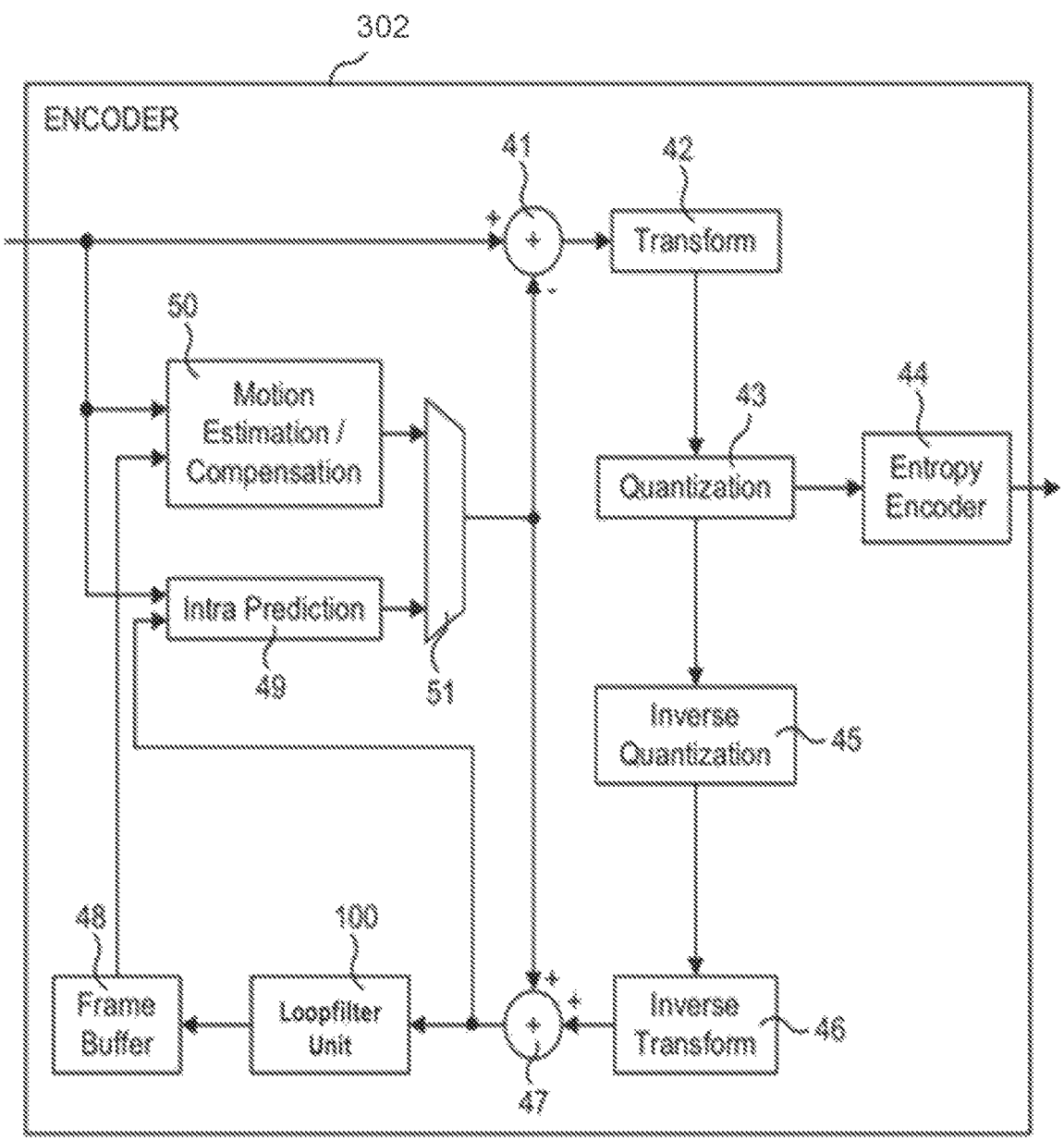
FIG. 4 is a block diagram of an encoder according to some embodiments.

FIG. 4 is a schematic block diagram of encoder 302. As illustrated in FIG. 4, the encoder 302 takes in an original image and subtracts a prediction 41 that is selected 51 from either previously decoded samples ("Intra Prediction" 49) or samples from previously decoded frames stored in the frame buffer 48 through a method called motion compensation 50. The task of finding the best motion compensation samples is typically called motion estimation 50 and involves comparing against the original samples. After subtracting the prediction 41 the resulting difference is transformed 42 and subsequently quantized 43. The quantized results are entropy encoded 44 resulting in bits that can be stored, transmitted or further processed. The output from the quantization 43 is also inversely quantized 45 followed by an inverse transform 46. Then the prediction from 51 is added 47 and the result is forwarded to both the intra prediction unit 49 and to the loopfilter unit 100. The loopfilter unit 100 may do deblocking, SAO and/or ALF filtering (including CC-ALF filtering). The result is stored in the frame buffer 48, which is used for future prediction. Not shown in FIG. 4 is that coding parameters for other blocks such as 42, 43, 49, 50, 51 and 100 also may also be entropy coded.

Figure 5:
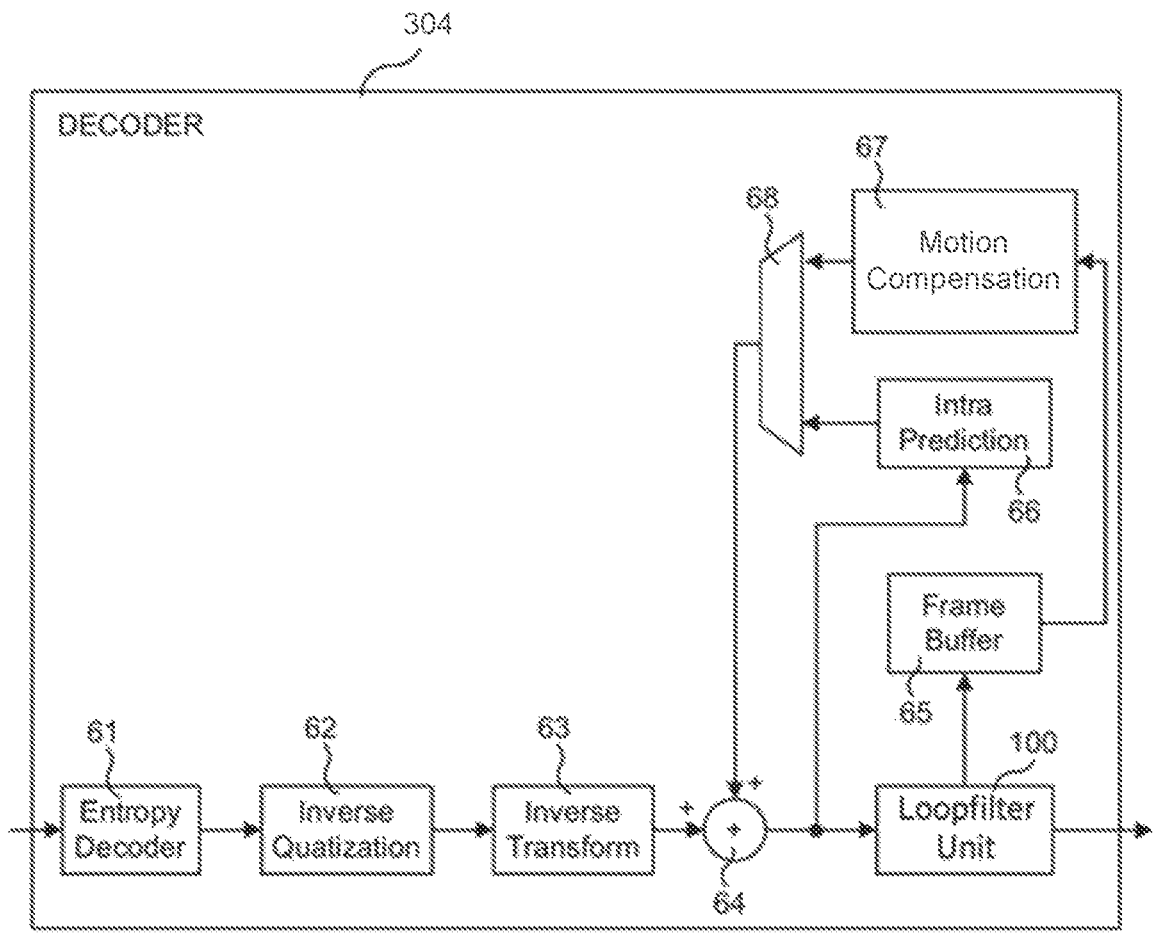
FIG. 5 is a block diagram of a decoder according to some embodiments.

FIG. 5 is a corresponding schematic block diagram of decoder 304 according to some embodiments. The decoder 304 takes in entropy coded transform coefficients which are then decoded by decoder 61. The output of decoder 61 then undergoes inverse quantization 62 followed by inverse transform 63 to form a decoded residual. To this decoded residual, a prediction is added 64. The prediction is selected 68 from either a motion compensation unit 67 or from an intra prediction unit 66. After having added the prediction to the decoded residual 64, the samples can be forwarded for intra prediction of subsequent blocks. The samples are also forwarded to the loopfilter unit 100, which may do deblocking, SAO processing, and/or ALF processing (including CC-ALF filtering). The output of the loopfilter unit 100 is forwarded to the frame buffer 65, which can be used for motion compensation prediction of subsequently decoded images 67. The output of the loopfilter unit 100 can also be output the decoded images for viewing or subsequent processing outside the decoder. Not shown in FIG. 5 is that parameters for other blocks such as 63, 67, 66 and 100 may also be entropy decoded. As an example, the coefficients for the ALF filter in block 100 may be entropy decoded.

Embodiment 1—Generic Solution

Figure 6:
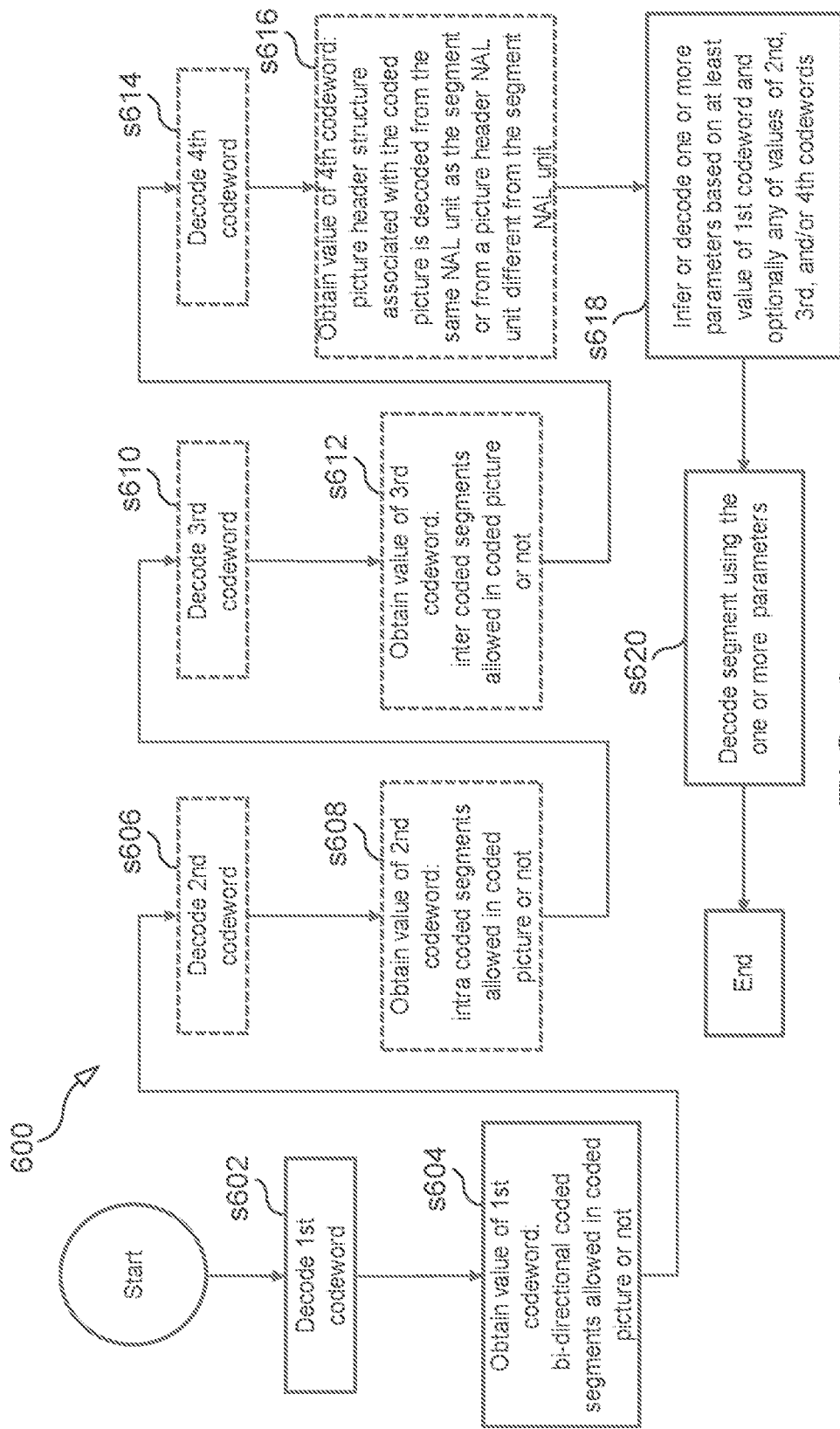
FIG. 6 is a flow chart illustrating a decoding process according to some embodiments.

FIG. 6 illustrates a process 600 performed by the decoder 304 according to some embodiments. In FIG. 6, optional steps are shown with dashed lines. In some embodiments, the process 600 may decode a segment 22 (e.g., a slice) of a coded picture from a bitstream 1. In some embodiments, the process 600 may include a step 602 of decoding a first codeword from the bitstream 1. In some embodiments, the process 600 may include a step 604 of obtaining a value of the first codeword. In some embodiments, the value of the first codeword may indicate whether the coded picture may contain bi-directional inter coded segments or not. In some embodiments, the process 600 may include a step 618 of deriving one or more parameter values based on the value of the first codeword. In some embodiments, the one or more parameter values may be derived in step of 618 by either (a) inferring the one or more parameter values or (b) decoding one or more parameters from the bitstream 1 to obtain the one or more parameter values. For example, in some embodiments, deriving the one or more parameter values in step of 618 may be based on the value of the first codeword because (a) the one or more parameter values may be derived by inferring the one or more parameter values if the first codeword has a one value, and (b) the one or more parameter values may be derived in step of 618 by decoding one or more parameters from the bitstream 1 to obtain the one or more parameter values if the first codeword has a different value. In some embodiments, the process 600 may include a step 620 of decoding the segment 22 based on the value of the first codeword and the one or more derived parameter values.

In some embodiments, the process 600 may include an optional step s606 of decoding a second codeword from the bitstream 1 and an optional step s608 of obtaining a value of the second codeword. In some embodiments, the value of the second codeword may indicate whether the coded picture may contain intra coded segments or not. In some embodiments, deriving of the one or more parameter values in step s618 may be further based on the value of the second codeword. For example, in some embodiments, deriving the one or more parameter values in step of 618 may be based on the values of the first and second codewords because (a) the one or more parameter values may be derived by inferring the one or more parameter values if the first and second codewords have one or more combinations of values, and (b) the one or more parameter values may be derived in step of 618 by decoding one or more parameters from the bitstream 1 to obtain the one or more parameter values if the first and second codewords have one or more different combinations of values.

In some embodiments, the process 600 may include an optional step s610 of decoding a third codeword from the bitstream 1 and an optional step s612 of obtaining a value of the third codeword. In some embodiments, the value of the third codeword may indicate whether the coded picture may contain inter coded segments or not. In some embodiments, the value of the third codeword may additionally or alternatively indicate whether the coded picture may contain uni-directional inter coded segments or not. In some embodiments, deriving of the one or more parameter values in step s618 may be further based on the value of the third codeword. For example, in some embodiments, deriving the one or more parameter values in step of 618 may be based on the values of the first, second, and/or third codewords because (a) the one or more parameter values may be derived by inferring the one or more parameter values if the first, second, and/or third codewords have one or more combinations of values, and (b) the one or more parameter values may be derived in step of 618 by decoding one or more parameters from the bitstream 1 to obtain the one or more parameter values if the first, second, and/or third codewords have one or more different combinations of values.

In some embodiments, one or more of the first, second, and third codewords may, for instance, be decoded from a picture header structure associated with the coded picture, decoding capability information, an access unit delimiter, or a parameter set such as a sequence parameter set, a video parameter set, or a picture parameter set.

In some embodiments, when the value of one of the first, second, and third codewords indicates that there may not be any segments of a particular type in the coded picture, a decoder may determine that no segment in the picture will contain any blocks such as any CTUs for which the prediction type corresponds to the particular type. In some embodiments, in this case, if the decoder anyway detects that there is a block or CTU that is using this disallowed prediction type, the decoder may conclude or determine that the bitstream is a non-conforming bitstream.

In some embodiments, the process 600 may include an optional step 614 of decoding a fourth codeword from the bitstream 1 and an optional step 616 of obtaining a value of the fourth codeword. In some embodiments, the value of the fourth codeword may indicate whether the picture header structure associated with the coded picture is decoded from the same NAL unit as the segment or from a picture header NAL unit different from the segment NAL unit. In an alternative version, the value of the fourth codeword may indicate that there is only one segment in the coded picture. In some embodiments, the fourth codeword may, for instance, be decoded from a segment header in the segment, decoding capability information, an access unit delimiter, or a parameter set such as a sequence parameter set, a video parameter set, or a picture parameter set. In some embodiments, the fourth codeword may be decoded from a picture parameter set.

In some embodiments, the deriving of the one or more parameter values in step 618 may be further based on the value of the fourth codeword. For example, in some embodiments, deriving the one or more parameter values in step of 618 may be based on the values of the first, second, third, and/or fourth codewords because (a) the one or more parameter values may be derived by inferring the one or more parameter values if the first, second, third, and/or fourth codewords have one or more combinations of values, and (b) the one or more parameter values may be derived in step of 618 by decoding one or more parameters from the bitstream 1 to obtain the one or more parameter values if the first, second, third, and/or fourth codewords have one or more different combinations of values.

In some embodiments, any of the first, second, third and fourth codewords may be a syntax element (e.g., flag).

In some embodiments, two or more of the first, second, third and fourth codewords may be the same codeword, such that two or more of the obtained values of the first, second, third, and fourth codewords may be obtained by decoding the same codeword.

In some embodiments, the value of the first codeword may indicate that the coded picture must contain at least one bi-directional inter coded segment. In some embodiments, the value of the second codeword may indicate that the coded picture must contain at least one intra coded segment. In some embodiments, the value of the third codeword may indicate that the coded picture must contain at least one inter coded segment. In some embodiments, the value of the third codeword may indicate that the coded picture must contain at least one uni-directional inter coded segment.

In some embodiments, an encoder may perform a subset or all of the following steps for encoding a segment of a picture to a bitstream:

1. Determine whether the coded picture will contain bi-directional inter coded blocks or not.

2. In response to determining that the coded picture will not contain any bi-directional inter coded blocks, encode a first value into the bitstream using a first codeword or syntax element. In response to determining that the coded picture may contain bi-directional inter coded blocks, encode a second value into the bitstream using the first codeword or syntax element, wherein the first and second values differ.

3. Optionally, determine whether the coded picture will contain intra coded blocks or not.

3a. In response to determining that the coded picture will not contain any intra coded blocks, encode a first value into the bitstream using a second codeword or syntax element. In response to determining that the coded picture may contain intra coded blocks encode a second value into the bitstream using the second codeword or syntax element wherein the first and second value differs.

4. Optionally, determine whether the coded picture will contain inter coded blocks or not.

4a. In response to determining that the coded picture will not contain any inter coded blocks, encode a first value into the bitstream using a third codeword or syntax element. In response to determining that the coded picture may contain inter coded blocks encode a second value into the bitstream using the third codeword or syntax element wherein the first and second value differs. In an alternative version, the value of the third codeword or syntax element is used to determine whether the coded picture may contain uni-directional (P) inter coded blocks or not.

5. Optionally, determine whether the picture header structure associated with the coded picture is decoded from the same NAL unit as the segment or from a picture header NAL unit different from the segment NAL unit.

5a. In response to determining that the picture header structure associated with the coded picture is decoded from the same NAL unit as the segment, encode a first value into the bitstream using a fourth codeword or syntax element. In response to determining that the picture header structure associated with the coded picture is decoded from a picture header NAL unit different from the segment NAL unit, encode a second value into the bitstream using the fourth codeword or syntax element wherein the first and second value differs. In an alternative version, the value of the fourth codeword or syntax element is used to determine whether there is only one segment in the coded picture or not.

6. Encode the segment to the bitstream using the one or more parameter values.

In some embodiments, a decoder may perform a subset or all of the following steps for decoding a segment in a coded picture from a bitstream:

1. Obtain a bitstream, where the bitstream comprises at least one coded picture and the coded picture comprises at least one segment 2. Decode a first codeword from the bitstream and obtain a value of the first codeword. Determine whether the coded picture may contain bi-directional inter coded segment or not from the value of the first codeword. The first codeword may, for instance, be a flag. For example, if the obtained value of the first codeword is a first value, e.g. 0, the coded picture shall not contain any bi-directional inter coded segments. That a value of a codeword is a particular value, or that a value of a codeword has a particular value, means that the value of the codeword is equal to a particular value. If the obtained value of the first codeword is a second value, e.g. 1, the coded picture may contain one or more bi-directional inter coded segments.

4. Optionally, decode a second codeword from the bitstream and obtain a value of the second codeword. Determine whether the coded picture may contain intra coded segment or not from the value of the second codeword. The second codeword may, for instance, be a flag. For example, if the obtained value of the second codeword is a first value, e.g. 0, the coded picture shall not contain any intra coded segments. If the value of the second codeword is a second value, e.g. 1, the coded picture may contain one or more intra coded segments.

5. Optionally, decode a third codeword from the bitstream and obtain a value of the third codeword. Determine whether the coded picture may contain inter coded segment or not from the value of the third code word. The third codeword may, for instance, be a flag. For example, if the value of the third codeword is a first value, e.g. 0, the coded picture shall not contain any inter coded segments. If the value of the third codeword is a second value, e.g. 1, the coded picture may contain one or more inter coded segments. In an alternative version, the value of the third codeword may be used to determine whether the coded picture may contain uni-directional (P) inter coded segments.

6. Optionally, decode a fourth codeword from the bitstream and obtain a value of the fourth codeword. Determine whether the picture header structure associated with the coded picture is decoded from the same NAL unit as the segment or from a picture header NAL unit different from the segment NAL unit from the value of the fourth codeword. The fourth codeword may, for instance, be a flag. For example, if the value of the fourth codeword is a first value, e.g. 0, the picture header structure is decoded from a NAL unit different than the segment. If the value of the fourth codeword is a second value, e.g. 1, the picture header structure is decoded from the same NAL unit as the segment. In an alternative version, the value of the fourth codeword may be used to determine whether there is only one segment in the coded picture or not.

7. Derive one or more parameter values, e.g. a segment type or a tool enable flag such as mvd_l1_zero_flag, based on at least the value of the first codeword and optionally based on the value(s) of one or more of the second, third, and fourth codeword by either (a) inferring the one or more parameter values or (b) decoding the one or more parameters from the bitstream to obtain the one or more parameter values. For example, in some embodiments, the values of the segment type and mvd_l1_zero_flag may be derived by decoding the segment type and mvd_l1_zero_flag to obtain their values if the value of the first codeword indicates that the coded picture may contain bi-directional inter coded segments. Otherwise, the values of the segment type and mvd_l1_zero_flag may be inferred (e.g., based on the value(s) of one or more of the first, second, third, and/or fourth codewords) if the value of the first codeword indicates that the coded picture may not contain bi-directional inter coded segments.

8. Decode a segment of the coded picture based on the one or more parameter values.

In some embodiments, one or more of the encoding and decoding steps need not be performed in the listed order. For instance, in some embodiments, the third codeword may be decoded before the first and second codewords.

An example of a syntax for signaling the first codeword in the picture header structure is shown below:

TABLE 7

| Picture header structure syntax | |
|---|---|
|  | Descriptor |
| picture_header_structure( ) {<br>  ...<br>  codeword_1<br>  ...<br>} | <br><br>u(1)<br> |

In some alternative embodiments, the presence of the first codeword (and/or the second codeword) in the picture header structure may be conditioned on another codeword, for instance the third codeword as shown in the example syntax below:

TABLE 8

| Alternative picture header structure syntax | |
|---|---|
|  | Descriptor |
| picture_header_structure( ) {<br>  ...<br>  codeword_3<br>  if( codeword_3 ) {<br>    codeword_2<br>    codeword_1<br>  }<br>  ...<br>} | <br><br>u(1)<br><br>u(1)<br>u(1)<br><br><br><br> |

Embodiment 2—Derive Slice Type from B-Slice Information 2.1 Define Segment Type (e.g., Slice Type)

In some embodiments, the one or more parameter values derived based on at least the value of the first codeword may include a segment type for the segment to be decoded. In some embodiments, a segment may be a slice, and the segment type may be a slice type. In some embodiments, the segment type may indicate one of the following:

1. The segment is an intra (I) coded segment, i.e. the segment may not use other pictures for prediction than the picture of the segment.
2. The segment is a uni-directional (P) inter coded segment, i.e. the segment may at most use one other picture other than the picture of the segment for prediction.
3. The segment is a bi-directional (B) inter coded segment, i.e. the segment may at most use two other pictures other than the picture of the segment for prediction.

In some alternative embodiments, the segment type may indicate one of the following (definitions taken from the VVC spec):

1. The segment is an intra (I) slice, i.e. a slice that is decoded using intra prediction only.
2. predictive (P) slice: A slice that is decoded using intra prediction or using inter prediction with at most one motion vector and reference index to predict the sample values of each block.
3. bi-predictive (B) slice: A slice that is decoded using intra prediction or using inter prediction with at most two motion vectors and reference indices to predict the sample values of each block.

2.2 Derivation of Segment Type

In some embodiments, two or more of the first, second, and third codewords may be the same codeword (e.g., such that the values of the first, second, and third codewords are obtained from the same codeword). In some embodiments, this codeword may be, for instance, called picture type and may be signaled in the picture header structure, PPS, or the access unit delimiter (AUD).

In some embodiments, the segment type (e.g., slice_type) may be inferred when the value of the fourth codeword indicates that the picture header structure is decoded from the same NAL unit as the segment. Otherwise, the segment type is signaled in and decoded from the segment header (e.g., slice header). This is exemplified in the syntax below, where the fourth codeword is a flag and is called picture_header_in_slice_header_flag:

TABLE 9

| Picture header structure syntax | |
|---|---|
|  | Descriptor |
| slice_header( ) {<br>  picture_header_in_slice_header_flag<br>  if( picture_header_in_slice_header_flag )<br>    picture_header_structure( )<br>  ...<br>  if( !picture_header_in_slice_header_flag )<br>    slice_type<br>  ...<br>} | <br>u(1)<br><br><br><br><br>ue(v)<br><br> |

In some embodiments, the segment type may be inferred when:
1. the value of the first codeword indicates that the coded picture may not contain bi-directional inter coded segments, and
2. the value of the second codeword indicates that the coded picture may not contain intra coded segments, and
3. the value of the third codeword indicates that the coded picture may contain inter coded segments This is exemplified in the syntax below with changes marked relative to the current version of VVC marked with underlining, and where the first, second, third and fourth codewords are flags and the first codeword is called ph_inter_B_slice_allowed_flag, the second codeword is called ph_intra_slice_allowed_flag, and the third codeword is called ph_inter_slice_allowed_flag:

TABLE 10

| Modified Slice Header Syntax | |
|---|---|
|  | Descriptor |
| slice_header( ) {<br>  picture_header_in_slice_header_flag<br>  if( picture_header_in_slice_header_flag )<br>    picture_header_structure( )<br>  ...<br>  if( ph_inter_slice_allowed_flag<br>  && ( ph_intra_slice_allowed_flag ||<br>    ph_inter_B_slice_allowed_flag ) )<br>    slice_type<br>  ...<br>} | <br>u(1)<br><br><br><br><br><br><br>ue(v)<br><br> |

Another example syntax is shown below with changes relative to the current version of VVC marked with underlining:

TABLE 11

Modified Slice Header Syntax

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ... | |
|   if( ph_inter_slice_allowed_flag | |
|   && !picture_header_in_slice_header_flag | |
|   && ( ph_intra_slice_allowed_flag | | | |
|   ph_inter_B_slice_allowed_flag ) ) | |
|     slice_type | ue(v) |
|   ... | |
| } | |

In some embodiments, based on this example syntax, the segment type may be inferred as:

1. Intra (I) coded segment, if the value of the third codeword indicates that the coded picture may not contain inter coded slices
2. uni-directional (P) inter coded segment, if otherwise the value of the third codeword indicates that the coded picture may contain inter coded slices and the value of the first codeword indicates that the coded picture may not contain bi-directional inter coded slices
3. bi-directional (B) inter coded segment, if otherwise the value of the third codeword indicates that the coded picture may contain inter coded slices and the value of the first codeword indicates that the coded picture may contain bi-directional inter coded slices This is exemplified in the semantics below, where changes relative to the current version of VVC are marked with underlining:

slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the following applies:
a. If ph_inter_slice_allowed_flag is equal to 0, the value of slice_type is inferred to be equal to 2. When ph_inter_slice_B_allowed_flag is equal to 0, the value of slice_type shall be equal to 1 or 2.
b. Otherwise, if ph_inter_slice_allowed_flag is equal to 1 and ph_inter_B_slice_allowed_flag is equal to 0, the value of slice_type is inferred to be equal to 1.
c. Otherwise, (ph_inter_slice_allowed_flag is equal to 1 and ph_inter_B_slice_allowed_flag is equal to 1) the value of slice_type is inferred to be equal to 0.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id] ] is equal to 1, slice_type shall be equal to 2.

The following table shows how slice_type is inferred in this version of the embodiment according to the text above.

TABLE 13

How Slice_Type is Inferred

| PH in SH | ph_inter_slice_allowed_flag | ph_intra_slice_allowed_flag | ph_inter_B_slice_allowed_flag | slice_type | slice_type |
|---|---|---|---|---|---|
| 0 or 1 | 0 | 1 (inferred) | 0 (inferred) | Inferred | 2 (I slice) |
| 1 | 1 | 0 or 1 | 0 | Inferred | 1 (P slice) |
| 1 | 1 | 0 or 1 | 1 | Inferred | 0 (B slice) |
| 0 | 1 | 0 | 0 | Inferred | 1 (P slice) |
| 0 | 1 | 0 | 1 | Signalled | P or B |
| 0 | 1 | 1 | 0 | Signalled | I or P |
| 0 | 1 | 1 | 1 | Signalled | I, P or B |

In some embodiments, the segment type may be inferred as uni-directional (P) inter coded segment if (i) the value of the second codeword indicates that the coded picture may not contain intra coded segments, (ii) the value of the third codeword indicates that the coded picture may contain inter coded segments, and (iii) the value of the first codeword indicates that the coded picture may not contain bi-directional inter coded segments.

2.3 Alternative Solutions to Define the First Code Word

In some embodiments, the first codeword may, for instance, be called ph_inter_slice_allowed_flag. In some embodiments, when the decoded value of the first codeword is equal to 0, the obtained value of the first codeword is equal to 0.

In some embodiments, when the value of the fourth codeword that indicates that the picture header structure associated with the picture is decoded from the same NAL unit as the segment, the first codeword could, for instance, be called ph_intra_slice_allowed_flag. In some embodiments, when the decoded value of the first codeword is equal to 1, the obtained value of the first codeword may be equal to 0.

In some embodiments, the first codeword may, for instance, be called ph_inter_B_slice_allowed_flag. In some embodiments, the obtained value of the first codeword may be equal to the decoded value of the first codeword.

2.4 Alternative Solutions to Derive Segment Type Based on the Value of the First Codeword The segment type derivation based on the value of the first codeword and optionally based on the value(s) of the second, the third, and/or the fourth codewords is shown as below. The "—" in a cell in the table means the value of the n-th codeword is optional to determine the derived value of the segment type.

TABLE 14

Alternative solutions to derive segment type based on the value of the first codeword

|  | First codeword | Second codeword | Third codeword | Fourth codeword | Segment type |
|---|---|---|---|---|---|
| Description | bi-directional coded segments allowed ? | Intra coded segments allowed ? | Inter coded segments allowed ? | Picture header structure decoded from same NAL as the segment ? | |
| Syntax element | ph_inter_B_slice_allowed_flag | ph_intra_slice_allowed_flag | ph_inter_slice_allowed_flag | picture_header_in_slice_header_flag | |
| Scenario 1 | 1 | — (should be 0) | — (should be 1) | 1 | Inferred to be B slice |
| Scenario 2 | 0 | 0 | 1 | — (can be 0/1) | Inferred to be P slice |
| Scenario 3 | 0 | 1 | 0 | — (can be 0/1) | Inferred to be I slice |
| Other scenarios | 1 | — | — (should be 1) | 0 | Signaled in and decoded from the bitstream |
|  | 0 | 1 | 1 | 0 | |

In some embodiments, the segment type may be derived by inferring a B slice value in the following scenario (scenario 1):

1. the value of the first codeword determines that the picture may contain bi-directional inter coded segments, and
2. the value of the fourth codeword determines that the picture header NAL unit is same as the segment NAL unit In some embodiments, the segment type may be derived by inferring a P slice value in the following scenario (scenario 2):

1. the value of the first codeword determines that the picture does not contain bi-directional inter coded segments, and
2. the value of the second codeword determines that the picture does not contain intra coded segments, and
3. the value of the third codeword determines that the picture may contain inter coded segments In some embodiments, the segment type may be derived by inferring an I slice value in the following scenario (scenario 3):

1. the value of the first codeword determines that the picture does not contain bi-directional inter coded segments, and
2. the value of the second codeword determines that the picture may contain intra coded segments, and
3. the value of the third codeword determines that the picture does not contain inter coded segments This is exemplified in the syntax below with additions relative to the current version of VVC marked with underlining. In the example, the values of the first, second, third, and fourth codewords are the values of flags, the first flag is called ph_inter_B_slice_allowed_flag, the second flag is called ph_intra_slice_allowed_flag, the third flag is called ph_inter_slice_allowed_flag, and the fourth flag is called picture_header_in_slice_header_flag:

TABLE 15

Slice Header Syntax

|  | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ... | |
|   if( ph_inter_slice_allowed_flag | |
|   && !picture_header_in_slice_header_flag | |
|   && | |
|   <u>( ph_intra_slice_allowed_flag \|\|</u> | |
|   <u>ph_inter_B_slice_allowed_flag ) )</u> | |
|     slice_type | ue(v) |
|   ... | |
| } | |

This is exemplified in the semantics below with additions relative to the current version of VVC marked with underlining and removed text italicized and shown in double brackets:

slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the following applies:
  a. when ph_inter_B_slice_allowed_flag is equal to 1, the value of slice_type is inferred to be equal to 0.
  b. Otherwise, when ph_inter_slice_allowed_flag is equal to 1, the value of slice_type is inferred to be equal to 1.
  c. Otherwise, (when ph_intra_slice_allowed_flag is equal to 1, the value of slice_type is inferred to be equal to 2).

When ph_intra_slice_allowed_flag is equal to 0, the value of slice_type shall be equal to 0 or 1. When ph_inter_slice_B_allowed_flag is equal to 0, the value of slice_type shall be equal to 1 or 2. When nal_unit_type is in the range of IDR_W_RADL to CRA_NUT, inclusive, and vps_independent_layer_flag[GeneralLayerIdx[nuh_layer_id] ] is equal to 1, slice_type shall be equal to 2.

Embodiment 3— Decode Parameters in the Picture Header Structure Based on Inter B Slice Allowed Flag In some embodiments, the value of the first codeword may be used to determine whether the one or more parameter values should be (a) inferred or (b) derived from one or more parameters decoded from the bitstream.

In some embodiments, when the value of the first codeword determines that the coded picture does not contain bi-directional inter coded segments, the one or more parameter values are inferred. When the value of the first codeword determines that the coded picture may contain bi-directional inter coded segments, the one or more parameter values are derived from one or more parameters decoded from the bitstream. In some embodiments, the one or more parameters may, for instance, be decoded from a picture header structure associated with the coded picture, a segment header in the segment, decoding capability information, an access unit delimiter, or a parameter set such as a sequence parameter set, a video parameter set, or a picture parameter set.

In some embodiments, the one or more parameters may, for instance, include a collocated from L0 flag, a MVD L1 zero flag, a flag for enabling/disabling bi-directional optical flow (BDOF), a flag for enabling/disabling decoder motion vector refinement (DMVR) and/or weighted prediction parameters.

This is exemplified in the syntax and semantics below with changes relative to the current version of VVC shown. Added text is underlined, and removed text is italicized and shown in double brackets:

|  | Descriptor |
|---|---|
| picture_header_structure( ) { |  |
| ... |  |
| ph_inter_slice_allowed_flag | u(1) |
| if( ph_inter_slice_allowed_flag ) { |  |
| ph_intra_slice_allowed_flag | u(1) |
| ph_inter_B_slice_allowed_flag | u(1) |
| } |  |
| ... |  |
| if( ph_inter_slice_allowed_flag ) { |  |
| ... | u(1) |
| if( cu_qp_delta_enabled_flag ) |  |
| ph_cu_qp_delta_subdiv_inter_slice | ue(v) |
| if( pps_cu_chroma_qp_offset_list_enabled_flag ) |  |
| ph_cu_chroma_qp_offset_subdiv_inter_slice | ue(v) |
| if( sps_temporal_mvp_enabled_flag ) { |  |
| ph_temporal_mvp_enabled_flag | u(1) |
| if( ph_temporal_mvp_enabled_flag && rpl_info_in_ph_flag ) { |  |
| if( ph_inter_B_slice_allowed_flag ) |  |
| ph_collocated_from_l0_flag | u(1) |
| if( (ph_collocated_from_l0_flag && num_ref_entries[ 0 ][ RplsIdx[ 0 ] ] > 1 ) \|\| ( !ph_collocated_from_l0_flag && num_ref_entries[ 1 ][ RplsIdx[ 1 ] ] > 1 ) ) |  |
| ph_collocated_ref_idx | ue(v) |
| } |  |

|  | Descriptor |
|---|---|
| } |  |
| [[mvd_l1_zero_flag]] | [[u(1)]] |
| if( sps_fpel_mmvd_enabled_flag ) |  |
| ph_fpel_mmvd_enabled_flag | u(1) |
| if( ph_inter_B_slice_allowed_flag ) { |  |
| mvd_l1_zero_flag | u(1) |
| if( sps_bdof_pic_present_flag ) |  |
| ph_disable_bdof_flag |  |
| if( sps_dmvr_pic_present_flag ) |  |
| ph_disable_dmvr_flag |  |
| } |  |
| if( sps_prof_pic_present_flag ) |  |
| ph_disable_prof_flag | u(1) |
| if( ( pps_weighted_pred_flag \|\| ( pps_weighted_bipred_flag && ph_inter_B_slice_allowed_flag) ) && wp_info_in_ph_flag ) |  |
| pred_weight_table( ) |  |
| } |  |
| ... |  |
| } |  | ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_sliceallowed_flag equal to 0 specifies that no coded slices of the picture have slice_type equal to 2. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 2—For bitstreams that are supposed to work subpicure based bitstream merging without the need of changing PH NAL units, the encoder is expected to set the values of both ph_inter_slice_allowed_flag and ph_intra_slice_allowed_flag equal to 1.

ph_inter_B_slice_allowed_flag equal to 0 specifies that no coded slice of the picture have slice_type equal to 0. ph_inter_B_slice_allowed_flag equal to 1 specifies that there may or may not be one or more coded slices in the picture that have slice_type equal to 0. When not present, ph_inter_B_slice_allowed_flag is inferred to be equal to 0.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1. When not present, ph_collocated_from_l0_flag is inferred to be equal to 1.

mvd_l1_zero_flag equal to 1 indicates that the mvd_coding (x0, y0, 1) syntax structure is not parsed and MvdL1[x0][y0][compIdx] and MvdCpL1[x0][y0][cpIdx][compIdx] are set equal to 0 for compIdx=0..1 and cpIdx=0..2. mvd_l1_zero_flag equal to 0 when ph_inter_B_slice_allowed_flag is equal to 1 indicates that the mvd_coding(x0, y0, 1) syntax structure is parsed. When not present, mvd_l1_zero_flag is inferred to be equal to 0.

Embodiment 4

In some embodiments, a decoder may perform a subset or all of the following steps for decoding a segment in a coded picture from a bitstream:

1. Determine whether the coded picture may contain inter coded segments or not by decoding a first syntax element (e.g., flag) from a syntax structure in the bitstream. A segment may, for instance, be a slice, and a syntax structure may, for instance, be a picture header structure syntax structure.

2. In response to determining that the coded picture may contain inter coded segments, (i) determine whether the coded picture may contain intra coded segments or not by decoding a second syntax element (e.g., flag) from a syntax structure in the bitstream and (ii) determine whether the coded picture may contain bi-directional inter coded segments or not by decoding a third syntax element (e.g., flag) from a syntax structure in the bitstream.

3. In response to determining that the coded picture may not contain inter coded segments, determine that the coded picture may only contain intra coded segments without decoding the second syntax element and without decoding the third syntax element.

4. In response to determining that the coded picture may contain bi-directional inter coded segments, decode at least one of a collocated_from_l0_flag, an mvd_l1_zero_flag, a dmvr_flag, or a prof_flag.

5. In response to determining that the coded picture may not contain bi-directional inter coded segments from the decoding of the third syntax element, infer at least one of the following:
   a. the value of a collocated_from_l0_flag as equal to 1,
   b. mvd_l1_zero_flag as equal to 0,
   c. dmvr_flag as equal to a value representing that dmvr is disabled, and
   d. prof_flag as equal to a value representing that prof is disabled.

6. Decode the segment of the current picture using the value of at least one of a collocated_from_l0_flag, an mvd_l1_zero_flag, a dmvr_flag, or a prof_flag.

7. Determine whether the syntax structure is present in a picture header NAL unit of the coded picture or in a slice header of the coded picture.

8. Decoding a fourth syntax element representing a slice type, wherein the presence of the fourth syntax element is conditioned as follows:
   if(ph_inter_slice_allowed_flag && !picture_header_in_slice_header_flag && (ph_intra_slice_allowed_flag||ph_inter_B_slice_allowed_flag))
where ph_inter_slice_allowed_flag is the first syntax element, ph_intra_slice_allowed_flag is the second syntax element, ph_inter_B_slice_allowed_flag is the third syntax element and picture_header_in_slice_header_flag is a syntax element (e.g., flag) indicating whether the syntax structure is present in a picture header NAL unit of the coded picture or in a slice header of the coded picture.

9. Determine that the fourth syntax element is not present due to the condition and further comprising inferring the slice_type as follows:
   a. If ph_inter_slice_allowed_flag is equal to 0, the value of slice_type is inferred to be equal to 2.
   b. Otherwise, if ph_inter_slice_allowed_flag is equal to 1 and ph_inter_B_slice_allowed_flag is equal to 0, the value of slice_type is inferred to be equal to 1.
   c. Otherwise, (ph_inter_slice_allowed_flag is equal to 1 and ph_inter_B_slice_allowed_flag is equal to 1) the value of slice_type is inferred to be equal to 0.

Some embodiments may include some or all of the features disclosed in the contribution proposals set forth below.

Flowcharts

Figure 7:
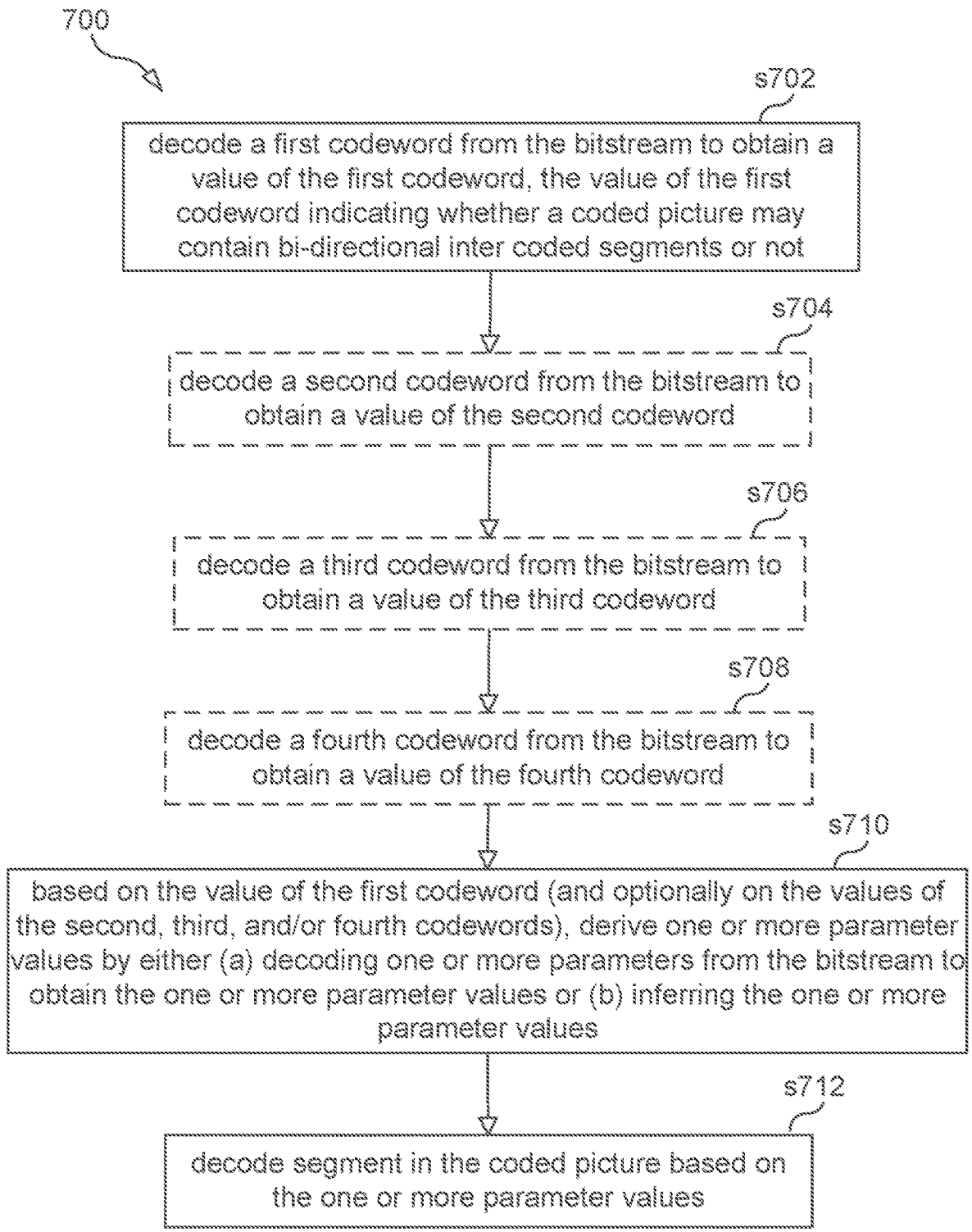
FIG. 7 is a flow chart illustrating a decoding process according to some embodiments.

FIG. 7 illustrates a process 700 performed by the decoder 304 according to some embodiments. In some embodiments, the process 700 may provide a method for decoding a segment 22 in a coded picture 2 from a bitstream 1.

In some embodiments, the coded picture 2 may be either (a) a coded picture that may contain bi-directional inter coded segments, which is a coded picture that may contain segments 22 of a type that specifies that a segment may contain blocks that are predicted using bi-directional inter prediction, or (b) a coded picture that may not contain bi-directional inter coded segments, which is a coded picture that does not contain any segment 22 of a type that specifies that a segment 22 may contain blocks that are predicted using bi-directional inter prediction. In some embodiments, the coded picture 2 may be either (a) a coded picture that may contain intra coded segments, which is a coded picture that may contain segments 22 of a type that specifies that the segments only contain blocks that are predicted using intra prediction, or (b) a coded picture that may not contain intra coded segments 22, which is a coded picture that does not contain any segment 22 of a type that specifies that the segments only contain blocks that are predicted using intra prediction. In some embodiments, the coded picture 2 may be either (a) a coded picture that may contain inter coded segments, which is a coded picture that may contain segments 22 of types that specify that a segment 22 may contain blocks that are predicted using one or both of bi-directional inter prediction and uni-directional inter prediction, (b) a coded picture that may not contain inter coded segments, which is a coded picture that does not contain any segment 22 of any type that specifies that the segment may contain any block that is predicted using bi-directional inter prediction or uni-directional inter prediction. In some embodiments, the coded picture 2 may be either (a) a coded picture that may contain uni-predicted inter coded segments, which is a coded picture that may contain segments 22 of a type that specifies that a segment 22 may contain blocks that are predicted using uni-predicted inter prediction, or (b) a coded picture that may not contain uni-predicted inter coded segments, which is a coded picture that does not contain any segment 22 of a type that specifies that a segment may contain blocks that are predicted using uni-predicted inter prediction.

In some embodiments, as shown in FIG. 7, the process 700 may include a step 702 of decoding a first codeword from the bitstream 1 to obtain a value of the first codeword. In some embodiments, the value of the first codeword may indicate whether the coded picture 2 may contain bi-directional inter coded segments or not.

In some embodiments, as shown in FIG. 7, the process 700 may include a step 704 of decoding a second codeword from the bitstream 1 to obtain a value of the second codeword. In some embodiments, the value of the second codeword may indicate whether the coded picture 2 may contain intra coded segments or not.

In some embodiments, as shown in FIG. 7, the process 700 may include an optional step 706 of decoding a third codeword from the bitstream 1 to obtain a value of the third codeword. In some embodiments, the value of the third codeword may indicate whether the coded picture may contain inter coded segments or not. In some alternative embodiments, the value of the third codeword may indicate whether the coded picture may contain uni-predicted inter coded segments or not.

In some embodiments, as shown in FIG. 7, the process 700 may include an optional step 708 of decoding a fourth codeword from the bitstream 1 to obtain a value of the fourth codeword. In some embodiments, the value of the fourth codeword may indicate whether a picture header structure associated with the coded picture is decoded from the same network abstraction layer (NAL) unit as the segment or from a picture header NAL unit different from the segment NAL unit.

In some embodiments, one or more of the first, second, third, and fourth codewords may be decoded from the picture header structure 21 associated with the coded picture 12, decoding capability information 12, an access unit delimiter 11, or a parameter set (e.g., a sequence parameter set 14, a video parameter set 13, or a picture parameter set 15). In some embodiments where the one or more of the first, second, third, and fourth codewords are decoded from the picture header structure associated with the coded picture, the picture header structure may be included in a picture header network abstraction layer (NAL) unit or in a segment header 31 of the segment 22. In some embodiments, one or more of the first, second, third, and fourth codewords may be decoded from a portion of the bitstream 1 other than the segment 22. In some embodiments, the first codeword may be decoded from a portion of the bitstream 1 other than an access unit delimiter 11.

In some embodiments, one or more of the first, second, third, and fourth codewords may be flags. In some embodiments, two or more of the first, second, third, and fourth codewords may be the same codeword.

In some embodiments, as shown in FIG. 7, the process 700 may include a step 710 of, based on at least the value of the first codeword, deriving one or more parameter values by either (a) decoding one or more parameters from the bitstream 1 to obtain the one or more parameter values or (b) inferring the one or more parameter values. In some embodiments, decoding the one or more parameters from the bitstream 1 to obtain the one or more parameter values may include decoding the one or more parameters from a picture header structure associated with the coded picture, a segment header of the segment, decoding capability information, an access unit delimiter, or a parameter set (e.g., a sequence parameter set, a video parameter set, or a picture parameter set). In some embodiments, inferring the one or more parameter values may include inferring one or more values that are either constant values or values that are derived without decoding any of the one or more parameters from the bitstream 1.

In some embodiments, the segment 22 may have a segment type, and one or more of the one or more parameter values indicate the segment type of the segment 22. In some embodiments, the segment type indicates whether the segment 22 is an intra (I) coded segment, a uni-directional (P) inter coded segment, or a bi-directional (B) inter coded segment. In some embodiments, the segment 22 may be a slice. In some embodiments, the slice may have a slice type, and one or more of the one or more parameter values may indicate the slice type of the slice. In some embodiments, the one or more parameters may additionally or alternatively include one or more of a collocated from L0 flag, a motion vector difference (MVD) L1 zero flag, a flag for enabling/disabling bi-directional optical flow (BDOF), and a flag for enabling/disabling decoder motion vector refinement (DMVR). In some embodiments, the one or more parameters may additionally or alternatively include weighted prediction parameters.

In some embodiments, deriving the one or more parameter values in step 710 may include inferring one or more parameter values (e.g., slice_type) that indicate that the segment type is a uni-directional (P) inter coded segment for one or more values that specify that the segment is a uni-directional inter coded segment if (i) the value of the first codeword indicates that the coded picture may not contain bi-directional inter coded segments, (ii) the value of the second codeword indicates that the coded picture may not contain intra coded segments, and (iii) the third codeword indicates that the coded picture may contain inter coded segments.

In some embodiments, deriving the one or more parameters values in step 710 may include: (1) inferring one or more parameter values (e.g., slice_type) that indicate that the segment type is an intra (I) coded segment for one or more values that specify that the segment is an intra coded segment if the value of the third codeword indicates that the coded picture may not contain inter coded slices; (2) inferring one or more parameter values (e.g., slice_type) that indicate that the segment type is a uni-directional (P) inter coded segment for one or more values that specify that the segment is a uni-directional inter coded segment if (i) the value of the third codeword indicates that the coded picture may contain inter coded slices and (ii) the value of the first codeword indicates that the coded picture may not contain bi-directional inter coded slices; and (3) inferring one or more parameter values (e.g., slice_type) that indicate that the segment type is a bi-directional (B) inter coded segment for one or more values that specify that the segment type is a bi-directional inter coded segment if (i) the value of the third codeword indicates that the coded picture may contain inter coded slices and (ii) the value of the first codeword indicates that the coded picture may contain bi-directional inter coded slices.

In some embodiments, if the value of the fourth codeword indicates that the picture header structure associated with the coded picture is decoded from the same NAL unit as the segment, the one or more parameters values may be derived in step 710 by inferring the one or more parameter values. In some embodiments, if the value of the fourth codeword indicates that the picture header structure associated with the coded picture is decoded from a picture header NAL unit different from the segment NAL unit, the one or more parameter values may be derived in step 710 by decoding one or more parameters from the bitstream to obtain the one or more parameter values.

In some embodiments, the one or more parameter values may be derived in step 710 by decoding one or more parameters from the bitstream to obtain the one or more parameter values if the value of the first codeword indicates that the coded picture shall not contain bi-directional inter coded segments, and the one or more parameter values may be derived in step 710 by inferring the one or more parameter values if the value of the first codeword indicates that the coded picture may contain bi-directional inter coded segments.

In some embodiments, as shown in FIG. 7, the process 700 may include a step 712 of decoding the segment in the coded picture based on the one or more parameter values.

Figure 8:
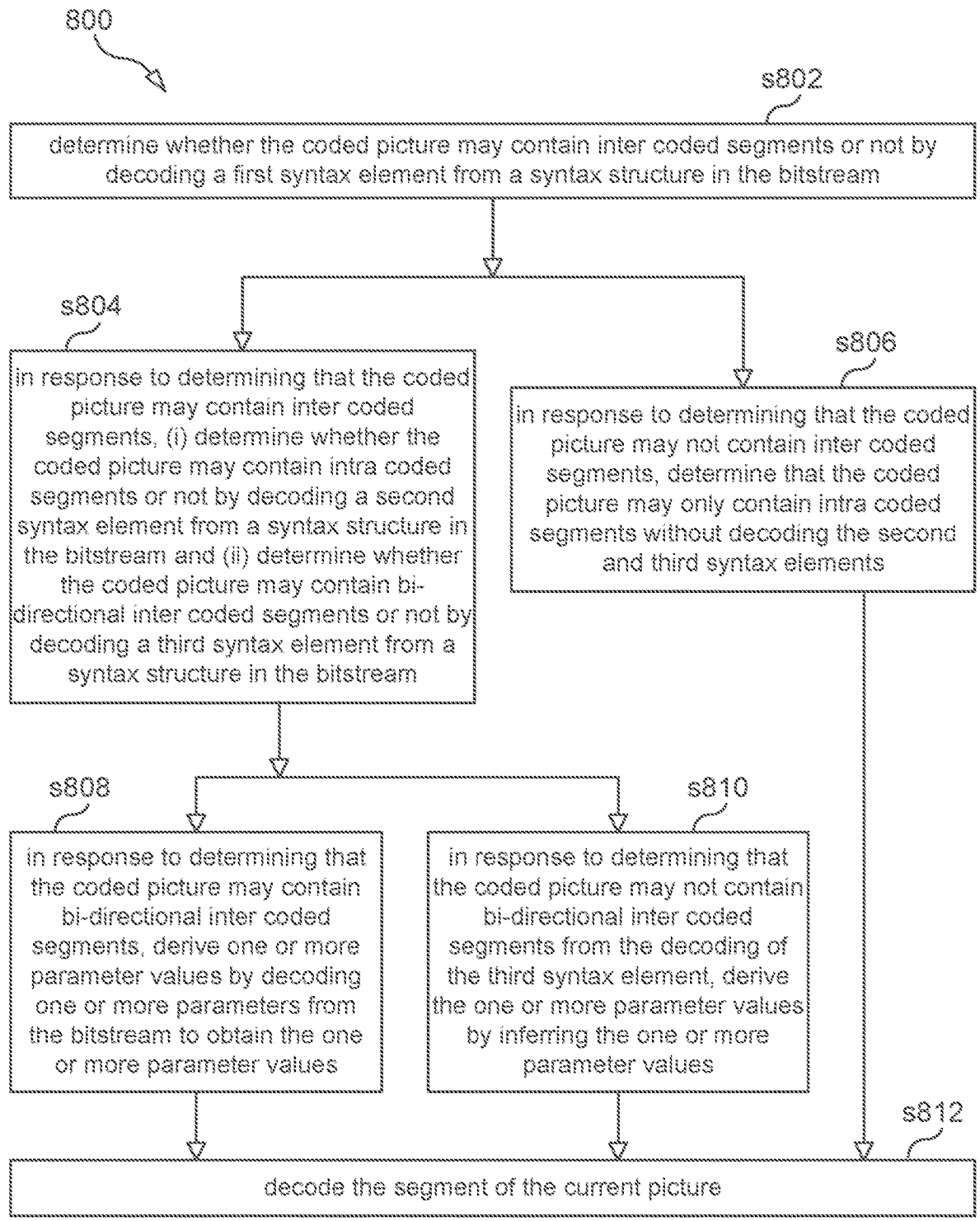
FIG. 8 is a flow chart illustrating a decoding process according to some embodiments.

FIG. 8 illustrates a process 800 performed by the decoder 304 according to some embodiments. In some embodiments, the process 800 may provide a method for decoding a segment 22 in a coded picture 2 from a bitstream 1. In some embodiments, the segment may be a slice.

In some embodiments, as shown in FIG. 8, the process 800 may include a step 802 of determining whether the coded picture 2 may contain inter coded segments or not by decoding a first syntax element from a syntax structure in the bitstream 1. In some embodiments, the syntax structure may be present in a picture header NAL unit of the coded picture 2 or in a slice header 31 of the coded picture 2.

In some embodiments, as shown in FIG. 8, the process 800 may include a step 804 of, in response to determining that the coded picture 2 may contain inter coded segments, (i) determining whether the coded picture 2 may contain intra coded segments or not by decoding a second syntax element from a syntax structure in the bitstream 1 and (ii) determining whether the coded picture 2 may contain bi-directional inter coded segments or not by decoding a third syntax element from a syntax structure in the bitstream 1.

In some embodiments, as shown in FIG. 8, the process 800 may include a step 806 of, in response to determining that the coded picture 2 may not contain inter coded segments, determining that the coded picture 2 may only contain intra coded segments without decoding the second syntax element and without decoding the third syntax element.

In some embodiments, as shown in FIG. 8, the process 800 may include a step 808 of, in response to determining that the coded picture 2 may contain bi-directional inter coded segments, deriving one or more parameter values by decoding one or more parameters from the bitstream 1 to obtain the one or more parameter values.

In some embodiments, as shown in FIG. 8, the process 800 may include a step 810 of, in response to determining that the coded picture 2 may not contain bi-directional inter coded segments from the decoding of the third syntax element, deriving the one or more parameter values by inferring the one or more parameter values.

In some embodiments, the one or more parameters may include one or more of a collocated from L0 flag (e.g., collocated_from_l0_flag), an MVD L1 zero flag (e.g., mvd_l1_zero_flag), a flag for enabling/disabling BDOF (e.g., ph_disable_bdof_flag), a flag for enabling/disabling DMVR (e.g., dmvr_flag). In some embodiments, the one or more parameters may additionally or alternatively include a prof_flag. In some embodiments, inferring the one or more parameter values in step 810 may include inferring one or more of (i) the value of a collocated from L0 flag (e.g., collocated_from_l0_flag) as equal to 1, (ii) the value of an MVD L1 zero flag (e.g., mvd_l1_zero_flag) as equal to 0, (iii) the value of a flag for enabling/disabling BDOF (e.g., ph_disable_bdof_flag) as equal to a value representing that BDOF is disabled, (iv) the value of a flag for enabling/disabling DMVR (e.g., dmvr_flag) as equal to a value representing that dmvr is disabled, and (iv) the value of the prof_flag as equal to a value representing that prof is disabled. In some embodiments, the prof_flag may specify whether a prediction refinement using optical flow may be used in an affine motion compensation process when decoding the coded picture or not.

In some embodiments, the process 800 may include an optional step of decoding a fourth syntax element representing a slice_type if (ph_inter_slice_allowed_flag && !picture_header_in_slice_header_flag && (ph_intra_slice_allowed_flag||ph_inter_B_slice_allowed_flag)), where the ph_inter_slice_allowed_flag may be the first syntax element, the ph_intra_slice_allowed_flag may be the second syntax element, ph_inter_B_slice_allowed_flag may be the third syntax element, and the picture_header_in_slice_header_flag may be a syntax element indicating whether the syntax structure is present in a picture header NAL unit of the coded picture or in a slice header of the coded picture.

In some embodiments, the process 800 may include an optional step of inferring a slice_type value without decoding a corresponding slice_type syntax element if the following condition is not met (ph_inter_slice_allowed_flag && !picture_header_in_slice_header_flag && (ph_intra_slice_allowed_flag||ph_inter_B_slice_allowed_flag)), where the ph_inter_slice_allowed_flag is the first syntax element, the ph_intra_slice_allowed_flag is the second syntax element, ph_inter_B_slice_allowed_flag is the third syntax element, and the picture_header_in_slice_header_flag is a syntax element indicating whether the syntax structure is present in a picture header NAL unit of the coded picture or in a slice header of the coded picture. In some embodiments, the slice_type may be inferred to be an intra (I) coded segment if the ph_inter_slice_allowed_flag is equal to 0, the slice_type may be inferred to be a uni-directional (P) inter coded segment if the ph_inter_slice_allowed_flag is equal to 1 and the ph_inter_B_slice_allowed_flag is equal to 0, and the slice_type may be inferred to be a bi-directional (B) inter coded segment if the ph_inter_slice_allowed_flag is equal to 1 and the ph_inter_B_slice_allowed_flag is equal to 1.

In some embodiments, as shown in FIG. 8, the process 800 may include a step 812 of decoding the segment of the coded picture. In some embodiments, the decoding may use the one or more parameter values.

Figure 9:
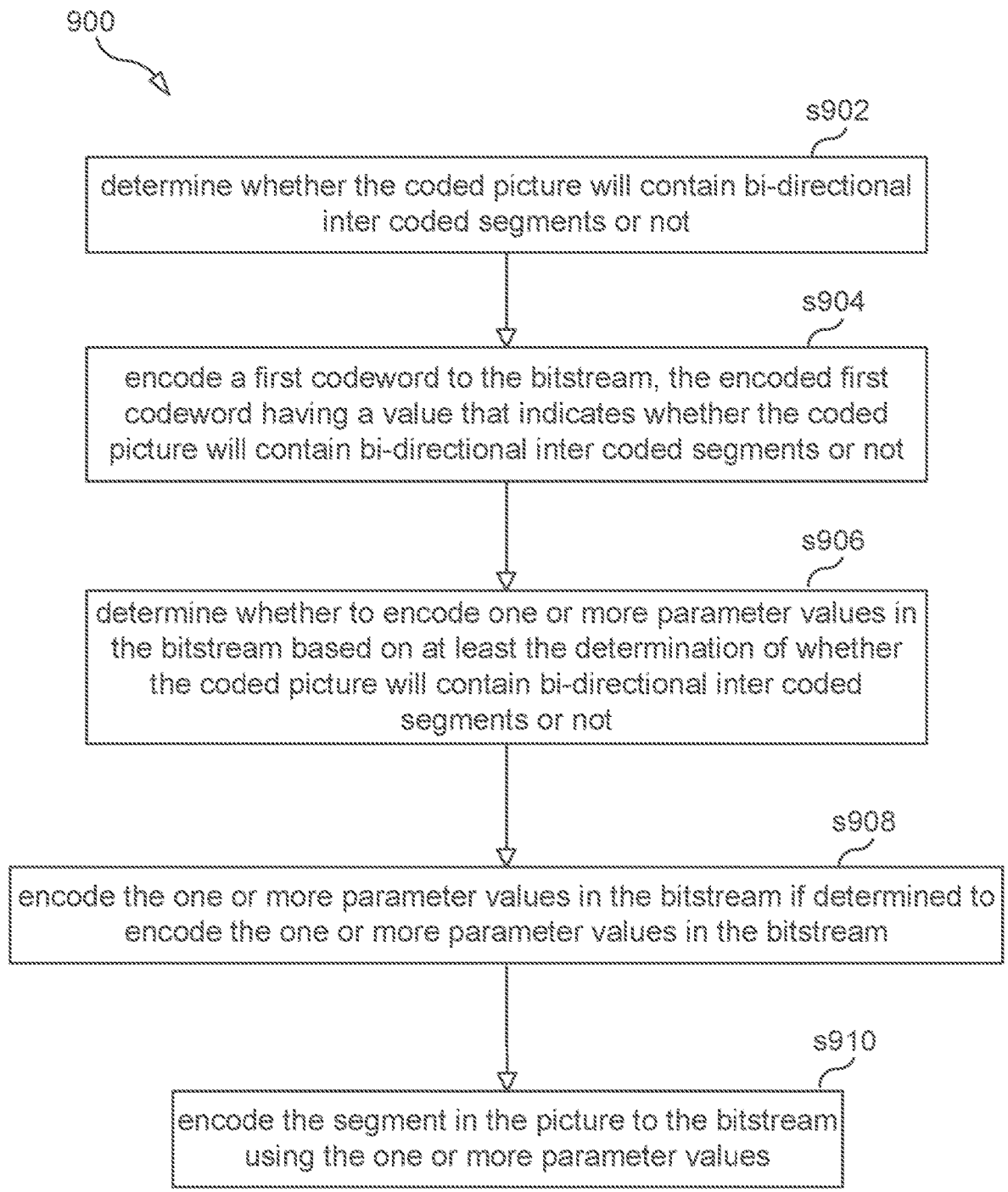
FIG. 9 is a flow chart illustrating an encoding process according to some embodiments.

FIG. 9 illustrates a process 900 performed by the encoder 302 according to some embodiments. In some embodiments, the process 900 may provide a method for encoding a segment 22 in a picture to a bitstream 1.

In some embodiments, the process 900 may include a step 902 of determining whether the coded picture 2 will contain bi-directional inter coded segments or not. In some embodiments, the process 900 may include a step 904 of encoding a first codeword to the bitstream 1. In some embodiments, the encoded first codeword may have a value that indicates whether the coded picture will contain bi-directional inter coded segments or not. In some embodiments, the process 900 may include a step 906 of determining whether to encode one or more parameter values in the bitstream 1 based on at least the determination of whether the coded picture will contain bi-directional inter coded segments or not. In some embodiments, the process 900 may include a step 908 of encoding the one or more parameter values in the bitstream 1 if determined to encode the one or more parameter values in the bitstream 1. In some embodiments, the process 900 may include a step 910 of encoding the segment in the picture to the bitstream using the one or more parameter values.

Figure 10:
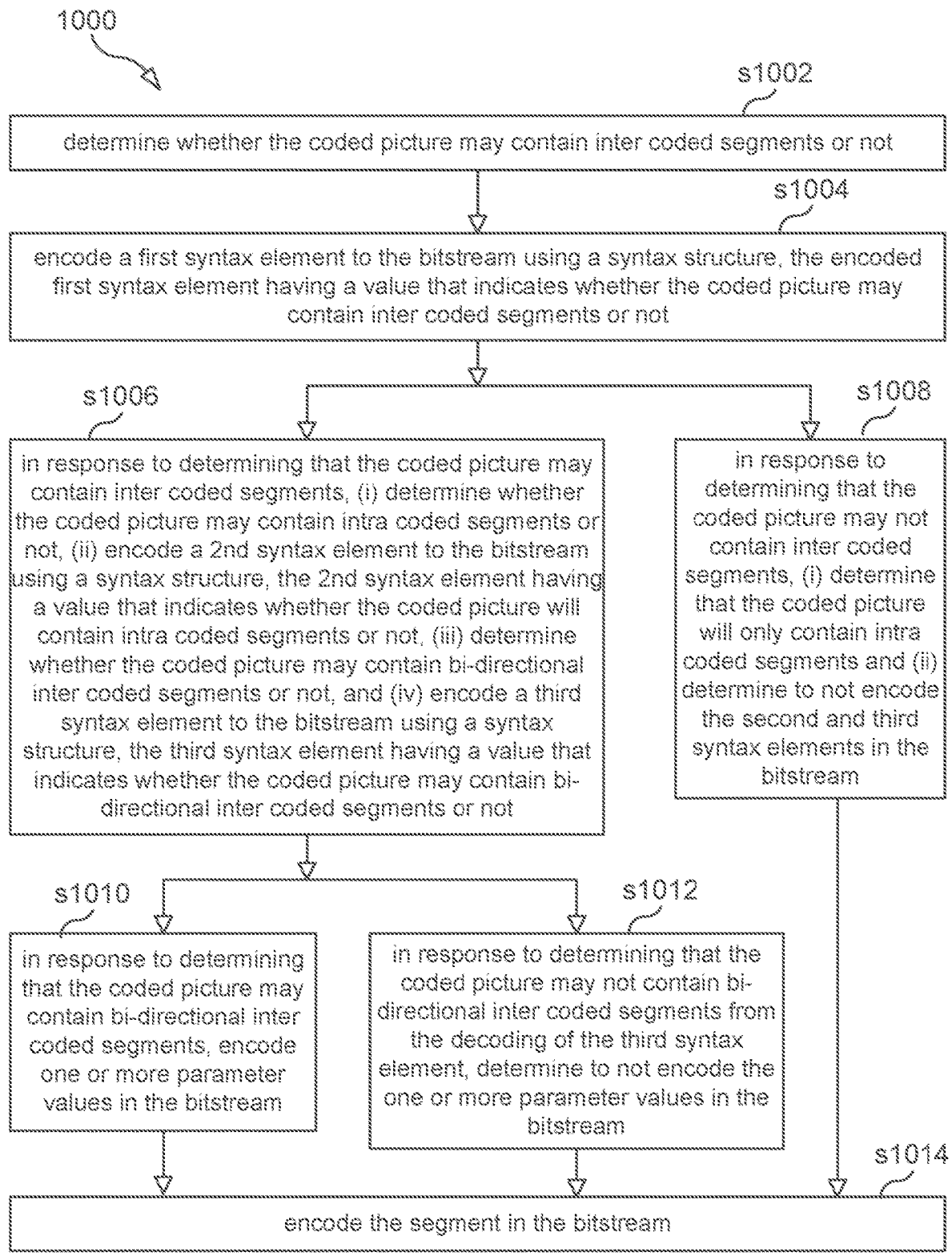
FIG. 10 is a flow chart illustrating an encoding process according to some embodiments.

FIG. 10 illustrates a process 1000 performed by the encoder 302 according to some embodiments. In some embodiments, the process 1000 may provide a method for encoding a segment 22 of a current picture into a coded picture 2 to a bitstream 1.

In some embodiments, the process 1000 may include a step 1002 of determining whether the coded picture 2 may contain inter coded segments or not. In some embodiments, the process 1000 may include a step 1004 of encoding a first syntax element to the bitstream 1 using a syntax structure. The encoded first syntax element may have a value that indicates whether the coded picture 2 may contain inter coded segments or not. In some embodiments, the process 1000 may include a step 1006 of, in response to determining that the coded picture 2 may contain inter coded segments, (i) determining whether the coded picture 2 may contain intra coded segments or not, (ii) encoding a second syntax element to the bitstream using a syntax structure, the second syntax element having a value that indicates whether the coded picture 2 will contain intra coded segments or not, (iii) determining whether the coded picture may contain bi-directional inter coded segments or not, and (iv) encoding a third syntax element to the bitstream 1 using a syntax structure, the third syntax element having a value that indicates whether the coded picture 2 may contain bi-directional inter coded segments or not.

In some embodiments, the process 1000 may include a step 1008 of, in response to determining that the coded picture 2 may not contain inter coded segments, (i) determining that the coded picture will only contain intra coded segments and (ii) determining to not encode the second and third syntax elements in the bitstream 1. In some embodiments, the process 1000 may include a step 1010 of, in response to determining that the coded picture 2 may contain bi-directional inter coded segments, encoding one or more parameter values in the bitstream 1. In some embodiments, the process 1000 may include a step 1012 of, in response to determining that the coded picture 2 may not contain bi-directional inter coded segments from the decoding of the third syntax element, determining to not encode the one or more parameter values in the bitstream 1. In some embodiments, the process 1000 may include a step 1014 of encoding the segment of the current picture in the bitstream 1. In some embodiments, the encoding may use the one or more parameter values.

Figure 11:
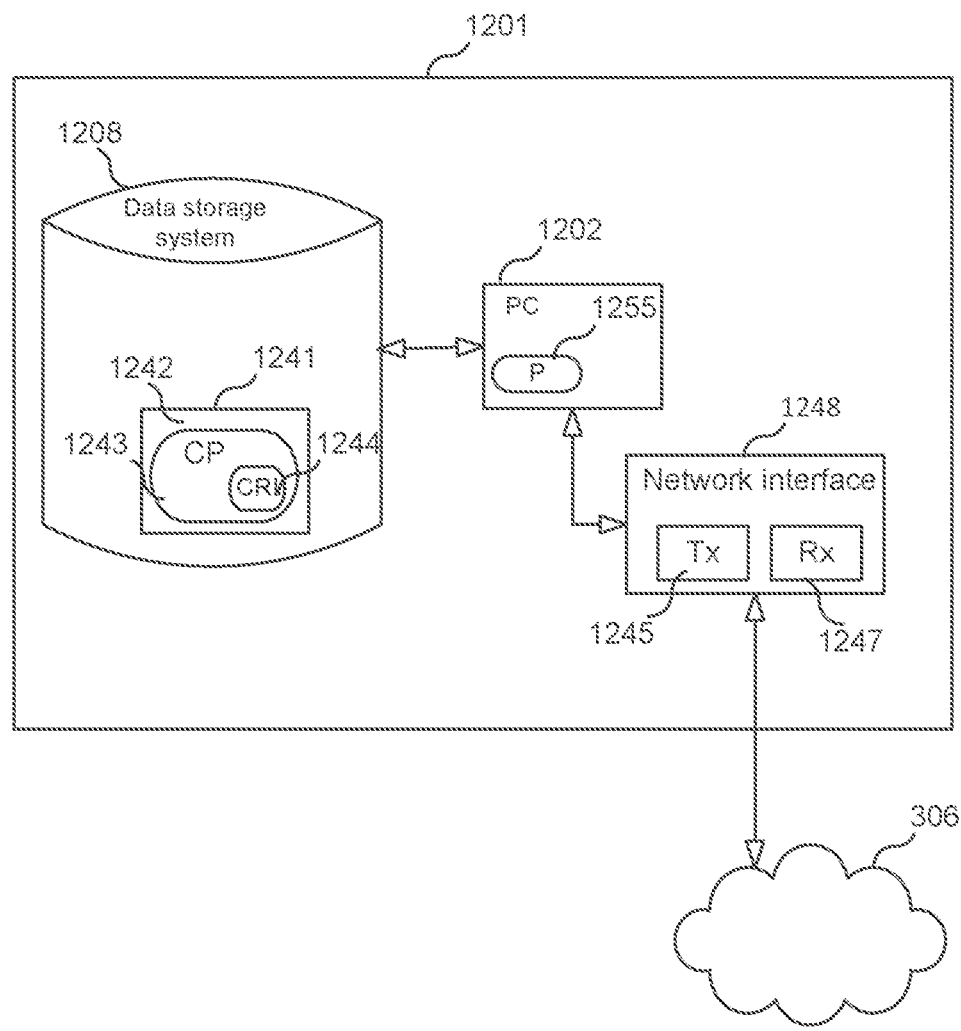
FIG. 11 is a block diagram of an apparatus for implementing an encoder or a decoder according to some embodiments.

FIG. 11 is a block diagram of an apparatus 1201 for implementing encoder 302 or decoder 304, according to some embodiments. That is, apparatus 1201 can be configured to perform the methods disclosed herein. In embodiments where apparatus 1201 implements encoder 302, apparatus 1201 may be referred to as "encoding apparatus 1201," and in embodiments where apparatus 1201 implements decoder 304, apparatus 1201 may be referred to as a "decoding apparatus 1201." As shown in FIG. 11, apparatus 1201 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; one or more network interfaces 1248 (which may be co-located or geographically distributed) where each network interface includes a transmitter (Tx) 1245 and a receiver (Rx) 1247 for enabling apparatus 1201 to transmit data to and receive data from other nodes connected to network 306 (e.g., an Internet Protocol (IP) network) to which network interface 1248 is connected; and one or more storage units (a.k.a., "data storage systems") 1208 which may be co-located or geographically distributed and which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is adapted such that when executed by PC 1202, the CRI causes apparatus 1201 to perform steps described herein (e.g., steps described herein with reference to the flow charts). In other embodiments, apparatus 1201 may be configured to perform steps described herein without the need for code. That is, for example, PC 1202 may consist merely of one or more ASICs. Hence, the features of the embodiments described herein may be implemented in hardware and/or software.

SUMMARY OF VARIOUS EMBODIMENTS

A1. A method (700) for decoding a segment in a coded picture from a bitstream, the method comprising: decoding a first codeword from the bitstream to obtain a value of the first codeword, wherein the value of the first codeword indicates whether the coded picture may contain bi-directional inter coded segments or not; based on the value of the first codeword, deriving one or more parameter values by either (a) decoding one or more parameters from the bitstream to obtain the one or more parameter values or (b) inferring the one or more parameter values; and decoding the segment in the coded picture based on the one or more parameter values.

A2A. The method of embodiment A1, wherein the first codeword is decoded from a picture header structure associated with the coded picture.

A2B. The method of embodiment A2A, wherein the picture header structure is included in a picture header network abstraction layer (NAL) unit or in a segment header of the segment.

A2C. The method of any one of embodiments A1-A2B, wherein the first codeword is decoded from a portion of the bitstream other than the segment.

A2D. The method of any one of embodiment A1 and A2C, wherein the first codeword is decoded from decoding capability information, an access unit delimiter, or a parameter set (e.g., a sequence parameter set, a video parameter set, or a coded picture parameter set).

A3. The method of any one of embodiments A1-A2C, wherein the first codeword is decoded from a portion of the bitstream other than an access unit delimiter.

A4. The method of any one of embodiments A1-A3, wherein the segment has a segment type, and one or more of the one or more parameter values indicate the segment type of the segment.

A5. The method of embodiment A4, wherein the segment type indicates whether the segment is an intra (I) coded segment, a uni-directional (P) inter coded segment, or a bi-directional (B) inter coded segment.

A6. The method of any one of embodiments A1-A5, further comprising decoding a second codeword from the bitstream to obtain a value of the second codeword, wherein the value of the second codeword indicates whether the coded picture may contain intra coded segments or not, and deriving the one or more parameter values is based on the values of the first and second codewords.

A7. The method of any one of embodiments A1-A6, further comprising decoding a third codeword from the bitstream to obtain a value of the third codeword, wherein the value of the third codeword indicates whether the coded picture may contain inter coded segments or not, and deriving the one or more parameter values is further based on the value of the third codeword.

A8. The method of any one of embodiments A1-A6, further comprising decoding a third codeword from the bitstream to obtain a value of the third codeword, wherein the value of the third codeword indicates whether the coded picture may contain uni-predicted inter coded segments or not, and deriving the one or more parameter values is further based on the value of the third codeword.

A9. The method of any one of embodiments A6-A8, wherein at least one of the second and third codewords is decoded from the picture header structure associated with the coded picture, decoding capability information, an access unit delimiter, or a parameter set (e.g., a sequence parameter set, a video parameter set, or a picture parameter set).

A10. The method of embodiment A7 or A9, wherein the segment has a segment type, and deriving the one or more parameter values comprises inferring one or more parameter values (e.g., slice_type) that indicate that the segment type is a uni-directional (P) inter coded segment for one or more values that specify that the segment is a uni-directional inter coded segment if (i) the value of the first codeword indicates that the coded picture may not contain bi-directional inter coded segments, (ii) the value of the second codeword indicates that the coded picture may not contain intra coded segments, and (iii) the third codeword indicates that the coded picture may contain inter coded segments.

A11. The method of embodiment A7 or A9, wherein the segment has a segment type, and deriving the one or more parameters values comprises: inferring one or more parameter values (e.g., slice_type) that indicate that the segment type is an intra (I) coded segment for one or more values that specify that the segment is an intra coded segment if the value of the third codeword indicates that the coded picture may not contain inter coded slices; inferring one or more parameter values (e.g., slice_type) that indicate that the segment type is a uni-directional (P) inter coded segment for one or more values that specify that the segment is a uni-directional inter coded segment if (i) the value of the third codeword indicates that the coded picture may contain inter coded slices and (ii) the value of the first codeword indicates that the coded picture may not contain bi-directional inter coded slices; and inferring one or more parameter values (e.g., slice_type) that indicate that the segment type is a bi-directional (B) inter coded segment for one or more values that specify that the segment type is a bi-directional inter coded segment if (i) the value of the third codeword indicates that the coded picture may contain inter coded slices and (ii) the value of the first codeword indicates that the coded picture may contain bi-directional inter coded slices.

A12. The method of any one of embodiments A1-A11, further comprising decoding a fourth codeword from the bitstream to obtain a value of the fourth codeword, wherein the value of the fourth codeword indicates whether a picture header structure associated with the coded picture is decoded from the same network abstraction layer (NAL) unit as the segment or from a picture header NAL unit different from the segment NAL unit, and deriving the one or more parameter values is further based on the value of the fourth codeword.

A13. The method of embodiment A12, wherein the fourth codeword is decoded from a segment header in the segment, decoding capability information, an access unit delimiter, or a parameter set such as a sequence parameter set, a video parameter set, or a picture parameter set.

A14. The method of embodiment A12 or A13, wherein, if the value of the fourth codeword indicates that the picture header structure associated with the coded picture is decoded from the same NAL unit as the segment, the one or more parameters values are derived by inferring the one or more parameter values.

A15. The method of any one of embodiments A12-A14, wherein, if the value of the fourth codeword indicates that the picture header structure associated with the coded picture is decoded from a picture header NAL unit different from the segment NAL unit, the one or more parameter values may be derived by decoding one or more parameters from the bitstream to obtain the one or more parameter values.

A16. The method of any one of embodiments A1-A15, wherein: the one or more parameter values are derived by decoding one or more parameters from the bitstream to obtain the one or more parameter values if the value of the first codeword indicates that the coded picture shall not contain bi-directional inter coded segments; and the one or more parameter values are derived by inferring the one or more parameter values if the value of the first codeword indicates that the coded picture may contain bi-directional inter coded segments.

A17. The method of any one of embodiments A1-A16, wherein decoding the one or more parameters from the bitstream to obtain the one or more parameter values comprises decoding the one or more parameters from a picture header structure associated with the coded picture, a segment header of the segment, decoding capability information, an access unit delimiter, or a parameter set (e.g., a sequence parameter set, a video parameter set, or a picture parameter set).

A18. The method of any one of embodiments A1-A17, wherein the one or more parameters are one or more of a collocated from L0 flag, a MVD L1 zero flag, a flag for enabling/disabling BDOF, a flag for enabling/disabling DMVR, and weighted prediction parameters.

A19. The method of any one of embodiments A1-A18, wherein the first codeword is a flag.

A20. The method of any one of embodiments A6-A19, wherein one or more of the second, third, and fourth codewords are flags.

A21. The method of any one of embodiments A6-A20, wherein two or more of the first, second, third, and fourth codewords are the same codeword.

A22. The method of any one of embodiments A1-A21, wherein the segment is a slice.

A23. The method of embodiment A22, wherein the slice has a slice type, and one or more of the one or more parameter values indicate the slice type of the slice.

A24. The method of any one of embodiments A1-A23, wherein inferring the one or more parameter values comprises inferring one or more values that are either constant values or values that are derived without decoding any of the one or more parameters from the bitstream.

A25. The method of any one of embodiments A1-A24, wherein the coded picture is either (a) a coded picture that may contain bi-directional inter coded segments, which is a coded picture that may contain segments of a type that specifies that a segment may contain blocks that are predicted using bi-directional inter prediction, or (b) a coded picture that may not contain bi-directional inter coded segments, which is a coded picture that does not contain any segment of a type that specifies that a segment may contain blocks that are predicted using bi-directional inter prediction.

A26. The method of any one of embodiments A1-A25, wherein the coded picture is either (a) a coded picture that may contain intra coded segments, which is a coded picture that may contain segments of a type that specifies that the segments only contain blocks that are predicted using intra prediction, or (b) a coded picture that may not contain intra coded segments, which is a coded picture that does not contain any segment of a type that specifies that the segment only contain blocks that are predicted using intra prediction.

A27. The method of any one of embodiments A1-A26, wherein the coded picture is either (a) a coded picture that may contain inter coded segments, which is a coded picture that may contain segments of types that specify that a segment may contain blocks that are predicted using one or both of bi-directional inter prediction and uni-directional inter prediction, or (b) a coded picture that may not contain inter coded segments, which is a coded picture that does not contain any segment of any type that specifies that the segment may contain any block that is predicted using bi-directional inter prediction or uni-directional inter prediction.

A28. The method of any one of embodiments A7-A26, wherein the coded picture is either (a) a coded picture that may contain uni-predicted inter coded segments, which is a coded picture that may contain segments of a type that specifies that a segment may contain blocks that are predicted using uni-predicted inter prediction, or (b) a coded picture that may not contain uni-predicted inter coded segments, which is a coded picture that does not contain any segment of a type that specifies that a segment may contain blocks that are predicted using uni-predicted inter prediction.

B1. An apparatus (304) configured to: decode a first codeword from a bitstream to obtain a value of the first codeword, wherein the value of the first codeword indicates whether a coded picture may contain bi-directional inter coded segments or not; based on the value of the first codeword, derive one or more parameter values by either (a) decoding one or more parameters from the bitstream to obtain the one or more parameter values or (b) inferring the one or more parameter values; and decode a segment of the coded picture based on the one or more parameter values.

C1. A method (800) for decoding a segment of a current picture from a coded picture in a bitstream, the method comprising: determining whether the coded picture may contain inter coded segments or not by decoding a first syntax element from a syntax structure in the bitstream; in response to determining that the coded picture may contain inter coded segments, (i) determining whether the coded picture may contain intra coded segments or not by decoding a second syntax element from a syntax structure in the bitstream and (ii) determining whether the coded picture may contain bi-directional inter coded segments or not by decoding a third syntax element from a syntax structure in the bitstream; in response to determining that the coded picture may not contain inter coded segments, determining that the coded picture may only contain intra coded segments without decoding the second syntax element and without decoding the third syntax element; in response to determining that the coded picture may contain bi-directional inter coded segments, deriving one or more parameter values by decoding one or more parameters from the bitstream to obtain the one or more parameter values; in response to determining that the coded picture may not contain bi-directional inter coded segments from the decoding of the third syntax element, deriving the one or more parameter values by inferring the one or more parameter values; and decoding the segment of the current picture using the one or more parameter values.

C2. The method of embodiment C1, wherein the one or more parameters include one or more of a collocated_from_l0_flag, a mvd_l1_zero_flag, a dmvr_flag, and a prof_flag.

C3. The method of embodiment C1 or C2, wherein inferring the one or more parameter values comprises inferring one or more of (i) the value of the collocated_from_l0_flag as equal to 1, (ii) the value of the mvd_l1_zero_flag as equal to 0; (iii) the value of the dmvr_flag as equal to a value representing that dmvr is disabled, and (iv) the value of the prof_flag as equal to a value representing that prof is disabled.

C4. The method of any one of embodiments C1-C3, wherein the syntax structure is present in a picture header NAL unit of the coded picture or in a slice header of the coded picture.

C5. The method of any one of embodiments C1-C4, further comprising decoding a fourth syntax element representing a slice_type if (ph_inter_slice_allowed_flag && !picture_header_in_slice_header_flag && (ph_intra_slice_allowed_flag||ph_inter_B_slice_allowed_flag)), where the ph_inter_slice_allowed_flag is the first syntax element, the ph_intra_slice_allowed_flag is the second syntax element, ph_inter_B_slice_allowed_flag is the third syntax element, and the picture_header_in_slice_header_flag is a syntax element indicating whether the syntax structure is present in a picture header NAL unit of the coded picture or in a slice header of the coded picture.

C6. The method of any one of embodiments C1-05, further comprising inferring a slice_type value without decoding a corresponding slice_type syntax element if the following condition is not met: (ph_inter_slice_allowed_flag && !picture_header_in_slice_header_flag && (ph_intra_slice_allowed_flag||ph_inter_B_slice_allowed_flag)), where the ph_inter_slice_allowed_flag is the first syntax element, the ph_intra_slice_allowed_flag is the second syntax element, ph_inter_B_slice_allowed_flag is the third syntax element, and the picture_header_in_slice_header_flag is a syntax element indicating whether the syntax structure is present in a picture header NAL unit of the coded picture or in a slice header of the coded picture.

C7. The method of embodiment C6, wherein: the slice_type is inferred to be an intra (I) coded segment if the ph_inter_slice_allowed_flag is equal to 0; the slice_type is inferred to be a uni-directional (P) inter coded segment if the ph_inter_slice_allowed_flag is equal to 1 and the ph_inter_B_slice_allowed_flag is equal to 0; and the slice_type is inferred to be a bi-directional (B) inter coded segment if the ph_inter_slice_allowed_flag is equal to 1 and the ph_inter_B_slice_allowed_flag is equal to 1.

C8. The method of any one of embodiments C1-C7, wherein the segment is a slice.

C9. The method of any one of embodiments C2-C8, wherein the prof_flag specifies whether a prediction refinement using optical flow may be used in an affine motion compensation process when decoding the current picture or not.

D1. An apparatus (304) configured to: determine whether a coded picture in a bitstream may contain inter coded segments or not by decoding a first syntax element from a syntax structure in the bitstream; in response to determining that the coded picture may contain inter coded segments, (i) determine whether the coded picture may contain intra coded segments or not by decoding a second syntax element from a syntax structure in the bitstream and (ii) determine whether the coded picture may contain bi-directional inter coded segments or not by decoding a third syntax element from a syntax structure in the bitstream; in response to determining that the coded picture may not contain inter coded segments, determine that the coded picture may only contain intra coded segments without decoding the second syntax element and without decoding the third syntax element; in response to determining that the coded picture may contain bi-directional inter coded segments, derive one or more parameter values by decoding one or more parameters from the bitstream to obtain the one or more parameter values; in response to determining that the coded picture may not contain bi-directional inter coded segments from the decoding of the third syntax element, derive the one or more parameter values by inferring the one or more parameter values; and decode a segment of a current picture using the one or more parameter values.

E1. A method (900) for encoding a segment in a picture to a bitstream, the method comprising: determining whether the coded picture will contain bi-directional inter coded segments or not; encoding a first codeword to the bitstream, wherein the encoded first codeword has a value that indicates whether the coded picture will contain bi-directional inter coded segments or not; determining whether to encode one or more parameter values in the bitstream based on the determination of whether the coded picture will contain bi-directional inter coded segments or not; encoding the one or more parameter values in the bitstream if determined to encode the one or more parameter values in the bitstream; and encoding the segment in the picture to the bitstream using the one or more parameter values.

F1. An apparatus (302) configured to: determine whether a coded picture may contain bi-directional inter coded segments or not; encode a first codeword to a bitstream, wherein the encoded first codeword has a value that indicates whether the coded picture may contain bi-directional inter coded segments or not; determine whether to encode one or more parameter values in the bitstream based on the determination of whether the coded picture may contain bi-directional inter coded segments or not; encode the one or more parameter values in the bitstream if determined to encode the one or more parameter values in the bitstream; and encode a segment in the picture to the bitstream using the one or more parameter values.

G1. A method (1000) for encoding a segment of a current picture into a coded picture in a bitstream, the method comprising: determining whether the coded picture may contain inter coded segments or not; encoding a first syntax element to the bitstream using a syntax structure, wherein the encoded first syntax element has a value that indicates whether the coded picture may contain inter coded segments or not; in response to determining that the coded picture may contain inter coded segments, (i) determining whether the coded picture may contain intra coded segments or not, (ii) encoding a second syntax element to the bitstream using a syntax structure, the second syntax element having a value that indicates whether the coded picture will contain intra coded segments or not, (iii) determining whether the coded picture may contain bi-directional inter coded segments or not, and (iv) encoding a third syntax element to the bitstream using a syntax structure, the third syntax element having a value that indicates whether the coded picture may contain bi-directional inter coded segments or not; in response to determining that the coded picture may not contain inter coded segments, (i) determining that the coded picture will only contain intra coded segments and (ii) determining to not encode the second and third syntax elements in the bitstream; in response to determining that the coded picture may contain bi-directional inter coded segments, encoding one or more parameter values in the bitstream; in response to determining that the coded picture may not contain bi-directional inter coded segments from the decoding of the third syntax element, determining to not encode the one or more parameter values in the bitstream; and encoding the segment of the current picture in the bitstream using the one or more parameter values.

H1. An apparatus (302) configured to: determine whether a coded picture may contain inter coded segments or not; encode a first syntax element to a bitstream using a syntax structure, wherein the encoded first syntax element has a value that indicates whether the coded picture may contain inter coded segments or not; in response to determining that the coded picture may contain inter coded segments, (i) determine whether the coded picture may contain intra coded segments or not, (ii) encode a second syntax element to the bitstream using a syntax structure, the second syntax element having a value that indicates whether the coded picture will contain intra coded segments or not, (iii) determine whether the coded picture may contain bi-directional inter coded segments or not, and (iv) encode a third syntax element to the bitstream using a syntax structure, the third syntax element having a value that indicates whether the coded picture may contain bi-directional inter coded segments or not; in response to determining that the coded picture may not contain inter coded segments, (i) determine that the coded picture will only contain intra coded segments and (ii) determine to not encode the second and third syntax elements in the bitstream; in response to determining that the coded picture may contain bi-directional inter coded segments, encode one or more parameter values in the bitstream; in response to determining that the coded picture may not contain bi-directional inter coded segments from the decoding of the third syntax element, determine to not encode the one or more parameter values in the bitstream; and encode a segment of the current picture in the bitstream using the one or more parameter values.

I1. A computer program comprising instructions for adapting an apparatus to perform the method of any one of embodiments A1-A24, C1-C7, E1, and G1.

J1. A carrier containing the computer program of embodiment E1, wherein the carrier is one of an electronic signal, optical signal, radio signal, or compute readable storage medium.

K1. An apparatus (108 or 110), the apparatus comprising: processing circuitry (602); and a memory (642), said memory containing instructions (644) executable by said processing circuitry, whereby said apparatus is operative to perform the method of any one of the embodiments A1-A24, C1-C7, E1, and G1.

L1. Any combination of the embodiments set forth above.

Contribution Proposals

Abstract

This contribution proposes the following changes to the VVC specification:

1. Signal a flag ph_inter_B_slice_allowed_flag in the PH when ph_inter_slice_allowed_flag is equal to 1 and condition the presence of ph_collocated_from_10_flag, mvd_l1_zero_flag, ph_disable_bdof_flag and ph_disable_dmvr_flag such that they are not present when ph_inter_B_slice_allowed_flag is equal to 0. Further, condition the presence of pred_weight_table( ) in the PH as follows where the underlined text is added:
   if((pps_weighted_pred_flag||(pps_weighted_bipred_flag && ph_inter_B_slice_allowed_flag)) && wp_info_in_ph_flag)
   pred_weight_table( )

2. Signal slice_type in the slice header only when ph_inter_slice_allowed_flag is equal to 1 and picture_header_in_slice_header_flag is equal to 0 and either one of ph_intra_slice_allowed_flag or ph_inter_B_slice_allowed_flag is equal to 1, otherwise infer slice_type as:
   a. 2 (I slice), if ph_inter_slice_allowed_flag is equal to 0.
   b. 1 (P slice), if ph_inter_slice_allowed_flag is equal to 1 and ph_inter_B_slice_allowed_flag is equal to 0.

c. 0 (B slice), if ph_inter_slice_allowed_flag is equal to 1 and ph_inter_B_slice_allowed_flag is equal to 1.

It is claimed that the ph_inter_B_slice_allowed_flag groups the syntax elements in the PH that are used only for bi-prediction in a similar way to how it is done in the slice header, and allows preventing signalling of syntax elements that are used only for bi-prediction when there are no B slices in the picture associated with the PH. It is claimed that signalling of syntax elements that has no meaning should in general be avoided.

It is further claimed that the ph_inter_B_slice_allowed_flag provides an easy way to check whether a picture is a B-picture or not. It is asserted that this would otherwise require checking whether there is any slice in the picture with slice_type equal to B. It is also claimed that the ph_inter_B_slice_allowed_flag provides some bit savings.

Specification text on top of JVET-Q2001-vC is provided with the contribution.

1. Introduction

This contribution proposes a ph_inter_B_slice_allowed_flag and condition several syntax elements in the PH on this flag. It is also proposed to derive the slice_type in certain cases based on the values of ph_inter_B_slice_allowed_flag, ph_inter_slice_allowed_flag, ph_intra_slice_allowed_flag and picture_header_in_slice_header_flag.

The ph_inter_B_slice_allowed_flag groups the syntax elements in the PH that are used only for bi-prediction, similar to how it is done in the slice header. This allows preventing signalling of syntax elements that are used only for bi-prediction when there are no B slices in the picture associated with the PH. We believe that signalling of syntax elements that has no meaning should in general be avoided.

The ph_inter_B_slice_allowed_flag also provides an easy way to check whether a picture is a B-picture or not. This would otherwise require checking that at least one slice in the picture has slice_type equal to B. The flag also effectively prevents enabling bi-prediction tools when these may not be used for the picture. Another benefit is that the flag provides some bit savings.

2. Proposal

The following changes are proposed to the VVC specification:

1. Signal a flag ph_inter_B_slice_allowed_flag in the PH when ph_inter_slice_allowed_flag is equal to 1 and condition the presence of ph_collocated_from_l0_flag, mvd_l1_zero_flag, ph_disable_bdof_flag and ph_disable_dmvr_flag such that they are not present when ph_inter_B_slice_allowed_flag is equal to 0. Further, condition the presence of pred_weight_table( ) in the PH as follows where the underlined text is added:
if((pps_weighted_pred_flag||(pps_weighted_bipred_flag && ph_inter_B_slice_allowed_flag)) && wp_info_in_ph_flag)
    pred_weight_table( )

2. Signal slice_type in the slice header only when ph_inter_slice_allowed_flag is equal to 1 and picture_header_in_slice_header_flag is equal to 0 and either one of ph_intra_slice_allowed_flag or ph_inter_B_slice_allowed_flag is equal to 1, otherwise infer slice_type as:
    a. 2 (I slice), if ph_inter_slice_allowed_flag is equal to 0.
    b. 1 (P slice), if ph_inter_slice_allowed_flag is equal to 1 and ph_inter_B_slice_allowed_flag is equal to 0.
    c. 0 (B slice), if ph_inter_slice_allowed_flag is equal to 1 and ph_inter_B_slice_allowed_flag is equal to 1.

Proposed syntax and semantics on top of JVET-Q2001-vC are shown below with added text underlined and removed text italicized and in double brackets.

2.1 Signal a ph_inter_B_slice_allowed_flag in the PH

|  | Descriptor |
|---|---|
| picture_header_structure( ) { |  |
| ... |  |
|   ph_inter_slice_allowed_flag | u(1) |
|   if( ph_inter_slice_allowed_flag ) { |  |
|     ph_intra_slice_allowed_flag | u(1) |
|     ph_inter_B_slice_allowed_flag | u(1) |
|   } |  |
| ... |  |
|   if( ph_inter_slice_allowed_flag ) { |  |
|     ... | u(1) |
|     if( cu_qp_delta_enabled_flag ) |  |
|       ph_cu_qp_delta_subdiv_inter_slice | ue(v) |
|     if( pps_cu_chroma_qp_offset_list_enabled_flag ) |  |
|       ph_cu_chroma_qp_offset_subdiv_inter_slice | ue(v) |
|     if( sps_temporal_mvp_enabled_flag ) { |  |
|       ph_temporal_mvp_enabled_flag | u(1) |
|       if( ph_temporal_mvp_enabled_flag && rpl_info_in_ph_flag ) { |  |
|         if( ph_inter_B_slice_allowed_flag ) |  |
|           ph_collocated_from_l0_flag | u(1) |
|         if( ( ph_collocated_from_l0_flag && num_ref_entries[ 0 ][ RplsIdx[ 0 ] ] > 1 ) || |  |
|           ( !ph_collocated_from_l0_flag && num_ref_entries[ 1 ][ RplsIdx[ 1 ] ] > 1 ) ) |  |
|           ph_collocated_ref_idx | ue(v) |
|       } |  |
|     } |  |
|     [[*mvd_l1_zero_flag*]] | [[*u(1)*]] |
|     if( sps_fpel_mmvd_enabled_flag ) |  |
|       ph_fpel_mmvd_enabled_flag | u(1) |
|     if( ph_inter_B_slice_allowed_flag ) { |  |
|       mvd_l1_zero_flag | u(1) |
|       if( sps_bdof_pic_present_flag ) |  |
|         ph_disable_bdof_flag |  |
|       if( sps_dmvr_pic_present_flag ) |  |
|         ph_disable_dmvr_flag |  |
|     } |  |
|     if( sps_prof_pic_present_flag ) |  |
|       ph_disable_prof_flag | u(1) |
|     if( ( pps_weighted_pred_flag || ( pps_weighted_bipred_flag && ph_inter_B_slice_allowed_flag) ) && wp_info_in_ph_flag ) |  |
|       pred_weight_table( ) |  |
|   } |  |
|   ... |  |
| } |  | ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that no coded slices of the picture have slice_type equal to 2. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

ph_inter_B_slice_allowed_flag equal to 0 specifies that no coded slice of the picture have slice_type equal to 0. ph_inter_B_slice_allowed_flag equal to 1 specifies that there may or may not be one or more coded slices in the picture that have slice_type equal to 0. When not present, ph_inter_B_slice_allowed_flag is inferred to be equal to 0.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1. When not present, ph_collocated_from_l0_flag is inferred to be equal to 1.

mvd_l1_zero_flag equal to 1 indicates that the mvd_coding(x0, y0, 1) syntax structure is not parsed and MvdL1[x0][y0][compIdx] and MvdCpL1 [x0][y0][cpIdx][compIdx] are set equal to 0 for compIdx=0..1 and cpIdx=0..2. mvd_l1_zero_flag equal to 0 when ph_inter_B_slice_allowed_flag is equal to 1 indicates that the mvd_coding(x0, y0, 1) syntax structure is parsed. When not present, mvd_l1_zero_flag is inferred to be equal to 0.

2.2 Derivation of Slice_Type

|  | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ... | |
|   if( ph_inter_slice_allowed_flag && | |
|   !picture_header_in_slice_header_flag && | |
|   ( ph_intra_slice_allowed_flag \|\| | |
|   ph_inter_B_slice_allowed_flag ) ) | |
|     slice_type | ue(v) |
|   ... | |
| } | | slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the following applies:
a. If ph_inter_slice_allowed_flag is equal to 0, the value of slice_type is inferred to be equal to 2.
b. Otherwise, if ph_inter_slice_allowed_flag is equal to 1 and ph_inter_B_slice_allowed_flag is equal to 0, the value of slice_type is inferred to be equal to 1.
c. Otherwise, (ph_inter_slice_allowed_flag is equal to 1 and ph_inter_B_slice_allowed_flag is equal to 1) the value of slice_type is inferred to be equal to 0.

When ph_intra_slice_allowed_flag is equal to 0, the value of slice_type shall be equal to 0 or 1. When ph_inter_B_slice_allowed_flag is equal to 0, the value of slice_type shall be equal to 1 or 2. When nal_unit_type is in the range of IDR_W_RADL to CRA_NUT, inclusive, and vps_independent_layer_flag[GeneralLayerIdx[nuh_layer_id] ] is equal to 1, slice_type shall be equal to 2.

3. Table of Inference

The following table shows how slice_type is inferred in this proposal according to the text in section 2.2 of the contribution proposals above.

| PH in SH | ph_inter_slice_allowed_flag | ph_intra_slice_allowed_flag | ph_inter_B_slice_allowed_flag | slice_type | slice_type |
|---|---|---|---|---|---|
| 0 or 1 | 0 | 1 (inferred) | 0 (inferred) | Inferred | 2 (I slice) |
| 1 | 1 | 0 or 1 | 0 | Inferred | 1 (P slice) |
| 1 | 1 | 0 or 1 | 1 | Inferred | 0 (B slice) |
| 0 | 1 | 0 | 0 | Inferred | 1 (P slice) |
| 0 | 1 | 0 | 1 | Signalled | P or B |
| 0 | 1 | 1 | 0 | Signalled | I or P |
| 0 | 1 | 1 | 1 | Signalled | I, P or B |

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a segment in a coded picture from a bitstream, the method comprising:
   decoding a first codeword from a picture header structure included in a picture header network abstraction layer (NAL) unit in the bitstream to obtain a value of the first codeword, wherein the picture header structure is associated with the coded picture and the value of the first codeword indicates whether the coded picture may contain bi-directional inter coded segments or not;
   decoding a fourth codeword from the bitstream to obtain a value of the fourth codeword, wherein the value of the fourth codeword indicates that the picture header structure associated with the coded picture is to be decoded from a picture header NAL unit that is different from a NAL unit of the segment;
   based on the value of the first codeword and the fourth codeword, deriving one or more parameter values by either (a) decoding one or more parameters from the picture header structure associated with the coded picture to obtain the one or more parameter values or (b) inferring the one or more parameter values; and
   decoding the segment in the coded picture based on the one or more parameter values.

2. The method of claim 1, further comprising decoding a third codeword from the bitstream to obtain a value of the third codeword, wherein the value of the third codeword indicates whether the coded picture may contain inter coded segments or not, and deriving the one or more parameter values is further based on the value of the third codeword.

3. The method of claim 2, wherein at least one of the second and third codewords is decoded from the picture header structure associated with the coded picture, decoding capability information, an access unit delimiter, or a parameter set.

4. The method of claim 2, wherein one or more of the second, third, and fourth codewords are flags.

5. The method of claim 2, wherein two or more of the first, second, third, and fourth codewords are the same codeword.

6. The method of claim 1, wherein the fourth codeword is decoded from a segment header in the segment, decoding capability information, an access unit delimiter, or a parameter set such as a sequence parameter set, a video parameter set, or a picture parameter set.

7. The method of claim 6, wherein, if the value of the fourth codeword indicates that the picture header structure associated with the coded picture is decoded from a picture header NAL unit different from the segment NAL unit, the one or more parameter values may be derived by decoding one or more parameters from the bitstream to obtain the one or more parameter values.

8. The method of claim 1, wherein:
the one or more parameter values are derived by decoding one or more parameters from the bitstream to obtain the one or more parameter values if the value of the first codeword indicates that the coded picture shall not contain bi-directional inter coded segments; and
the one or more parameter values are derived by inferring the one or more parameter values if the value of the first codeword indicates that the coded picture may contain bi-directional inter coded segments.

9. The method of claim 1, wherein the one or more parameters are one or more of a collocated from L0 flag, a motion vector difference (MVD) L1 zero flag, a flag for enabling/disabling bi-directional optical flow (BDOF), and a flag for enabling/disabling decoder motion vector refinement (DMVR).

10. The method of claim 1, wherein the segment is a slice.

11. The method of claim 1, wherein inferring the one or more parameter values comprises inferring one or more values that are either constant values or values that are derived without decoding any of the one or more parameters from the bitstream.

12. The method of claim 1, wherein the coded picture is either (a) a coded picture that may contain bi-directional inter coded segments, which is a coded picture that may contain segments of a type that specifies that a segment may contain blocks that are predicted using bi-directional inter prediction, or (b) a coded picture that may not contain bi-directional inter coded segments, which is a coded picture that does not contain any segment of a type that specifies that a segment may contain blocks that are predicted using bi-directional inter prediction.

13. A carrier containing a computer program which, when executed in a processor of an apparatus, configures the apparatus to implement the method of claim 1, wherein the carrier is a non-transitory computer readable storage medium.

14. An apparatus comprising:
processing circuitry; and
a memory, said memory containing instructions executable by said processing circuitry, whereby said apparatus is operative to:
decode a first codeword from a picture header structure included in a picture header network abstraction layer (NAL) unit in a bitstream to obtain a value of the first codeword, wherein the picture header structure is associated with the coded picture and the value of the first codeword indicates whether a coded picture may contain bi-directional inter coded segments or not;
decoding a fourth codeword from the bitstream to obtain a value of the fourth codeword, wherein the value of the fourth codeword indicates that the picture header structure associated with the coded picture is decoded from a picture header NAL unit different from the segment NAL unit;
based on the values of the first codeword and the fourth codeword, derive one or more parameter values by either (a) decoding one or more parameters from the picture header structure associated with the coded picture to obtain the one or more parameter values or (b) inferring the one or more parameter values; and
decode a segment of the coded picture based on the one or more parameter values.

15. A method for encoding a segment in a picture to a bitstream, the method comprising:
determining whether the coded picture will contain bi-directional inter coded segments or not;
encoding a first codeword to a picture header structure included in a picture header network abstraction layer (NAL) unit in the bitstream, wherein the picture header structure is associated with the coded picture and the encoded first codeword has a value that indicates whether the coded picture will contain bi-directional inter coded segments or not;
determining that the picture header structure associated with the coded picture is to be decoded from a picture header NAL unit different from the segment NAL unit;
encoding a fourth code word into the bitstream, wherein the value of the fourth codeword indicates that the picture header structure associated with the coded picture is to be decoded from a picture header NAL unit that is different from the segment NAL unit;
determining whether to encode one or more parameter values in the picture header structure associated with the coded picture based on the value of the fourth code word and the determination of whether the coded picture will contain bi-directional inter coded segments or not;
encoding the one or more parameter values in the picture header structure associated with the coded picture if determined to encode the one or more parameter values in the picture header structure associated with the coded picture; and
encoding the segment in the picture to the bitstream using the one or more parameter values.

16. An apparatus comprising:
processing circuitry; and
a memory, said memory containing instructions executable by said processing circuitry, whereby said apparatus is operative to:
determine whether a coded picture may contain bi-directional inter coded segments or not;
encode a first codeword to a picture header structure included in a picture header network abstraction layer (NAL) unit in a bitstream, wherein the picture header structure is associated with the coded picture and the encoded first codeword has a value that indicates whether the coded picture may contain bi-directional inter coded segments or not;

determining that the picture header structure associated with the coded picture is to be decoded from a picture header NAL unit different from the segment NAL unit;

encoding a fourth code word into the bitstream, wherein the value of the fourth codeword indicates that the picture header structure associated with the coded picture is to be decoded from a picture header NAL unit that is different from the segment NAL unit;

determine whether to encode one or more parameter values in the picture header structure associated with the coded picture based on the value of the fourth code word and the determination of whether the coded picture may contain bi-directional inter coded segments or not;

encode the one or more parameter values in the picture header structure associated with the coded picture if determined to encode the one or more parameter values in the picture header structure associated with the coded picture; and encode a segment in the picture to the bitstream using the one or more parameter values.

* * * * *

UNITED STATES PATENT AND TRADEMARK OFFICE
CERTIFICATE OF CORRECTION

PATENT NO. : 12,294,741 B2
APPLICATION NO. : 17/907704
DATED : May 6, 2025
INVENTOR(S) : Pettersson et al.

It is certified that error appears in the above-identified patent and that said Letters Patent is hereby corrected as shown below:

In the Specification

In Column 6, Line 41, delete "slice_type" and insert -- slice type --, therefor.

In Column 7, Line 61, delete "PH NUT" and insert -- PH_NUT --, therefor.

In Column 13, Line 67, delete "slice_type" and insert -- slice type --, therefor.

In Columns 13 & 14, Lines 67 & 1, delete "slice_type" and insert -- slice type --, therefor.

In Column 14, Line 13, delete "slice_type" and insert -- slice type --, therefor.

In Column 14, Line 15, delete "slice_type" and insert -- slice type --, therefor.

In Column 14, Line 18, delete "slice_type" and insert -- slice type --, therefor.

In Column 30, Line 29, delete "ph_intra_sliceallowed_flag" and insert
-- ph_intra_slice_allowed_flag --, therefor.

In Column 31, Line 56, delete "slice_type" and insert -- slice type --, therefor.

In Column 35, Line 55, delete "slice_type" and insert -- slice type --, therefor.

In Column 35, Line 66, delete "slice_type" and insert -- slice type --, therefor.

In Column 35, Line 67, delete "slice_type" and insert -- slice type --, therefor.

In Column 36, Line 11, delete "slice_type" and insert -- slice type --, therefor.

Signed and Sealed this
Twenty-first Day of October, 2025

John A. Squires
*Director of the United States Patent and Trademark Office*

CERTIFICATE OF CORRECTION (continued)
U.S. Pat. No. 12,294,741 B2

In Column 36, Line 13, delete "slice_type" and insert -- slice type --, therefor.

In Column 36, Line 16, delete "slice_type" and insert -- slice type --, therefor.

In Column 42, Line 10, delete "slice_type" and insert -- slice type --, therefor.

In Column 42, Line 20, delete "C1-05," and insert -- C1-C5, --, therefor.

In Column 42, Line 21, delete "slice_type" and insert -- slice type --, therefor.

In Column 42, Line 22, delete "slice_type" and insert -- slice type --, therefor.

In Column 42, Lines 33-34, delete "slice_type" and insert -- slice type --, therefor.

In Column 42, Line 35, delete "slice_type" and insert -- slice type --, therefor.

In Column 42, Lines 38-39, delete "slice_type" and insert -- slice type --, therefor.